United States Patent
Moon et al.

(10) Patent No.: US 11,689,484 B2
(45) Date of Patent: Jun. 27, 2023

(54) DYNAMIC CONFIGURATION AND POPULATION OF DIGITAL INTERFACES DURING PROGRAMMATICALLY ESTABLISHED CHATBOT SESSIONS

(71) Applicant: The Toronto-Dominion Bank, Toronto (CA)

(72) Inventors: Tae Gyun Moon, Toronto (CA); Robert Alexander McCarter, Eden (CA); Kheiver Kayode Roberts, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 631 days.

(21) Appl. No.: 16/574,266

(22) Filed: Sep. 18, 2019

(65) Prior Publication Data
US 2021/0083996 A1    Mar. 18, 2021

(51) Int. Cl.
| H04L 51/02 | (2022.01) |
| H04L 51/043 | (2022.01) |
| H04L 51/046 | (2022.01) |
| G06N 20/00 | (2019.01) |

(52) U.S. Cl.
CPC .......... *H04L 51/043* (2013.01); *G06N 20/00* (2019.01); *H04L 51/02* (2013.01); *H04L 51/046* (2013.01)

(58) Field of Classification Search
CPC ..... H04L 51/043; H04L 51/02; H04L 51/046; H04L 51/5805; G06N 20/00
See application file for complete search history.

(56) References Cited

U.S. PATENT DOCUMENTS

| 11,158,311 B1* | 10/2021 | Zhang | G06F 40/284 |
| 2006/0235690 A1* | 10/2006 | Tomasic | G06F 3/0481 |
| | | | 704/200 |
| 2006/0235691 A1* | 10/2006 | Tomasic | G06F 16/243 |
| | | | 704/232 |
| 2008/0215976 A1* | 9/2008 | Bierner | G06Q 99/00 |
| | | | 715/708 |
| 2009/0019354 A1* | 1/2009 | Jaiswal | G06F 16/958 |
| | | | 715/224 |
| 2009/0144161 A1* | 6/2009 | Fisher | G06Q 20/3821 |
| | | | 705/16 |
| 2017/0180485 A1* | 6/2017 | Lawson | H04L 65/403 |

(Continued)

*Primary Examiner* — Hitesh Patel
(74) *Attorney, Agent, or Firm* — Duane Morris LLP

(57) ABSTRACT

The disclosed exemplary embodiments include computer-implemented systems, apparatuses, and processes that dynamically configure and populate a digital interface based on sequential elements of message data exchanged during a chatbot session established programmatically between an apparatus and a device. For example, the apparatus may generate first messaging data that includes a candidate input value for an interface element of a digital interface, and transmit the first messaging data to the device during the programmatically established chatbot session. The apparatus may also receive, from the device during the programmatically established chatbot session, second messaging data that includes a confirmation of the candidate input value. Based on the second messaging data, the apparatus may generate populated interface data that associates the interface element with the confirmed candidate input value, and store the populated interface data within a memory.

21 Claims, 10 Drawing Sheets

(56) References Cited

U.S. PATENT DOCUMENTS

| | | | | |
|---|---|---|---|---|
| 2019/0349373 | A1* | 11/2019 | Fox | H04L 69/22 |
| 2020/0076750 | A1* | 3/2020 | Krishnaswamy | H04L 51/24 |
| 2020/0327196 | A1* | 10/2020 | Sampat | G06N 20/00 |
| 2020/0374244 | A1* | 11/2020 | John | H04L 67/40 |
| 2020/0380075 | A1* | 12/2020 | Boada | G06F 40/16 |

* cited by examiner

DYNAMIC CONFIGURATION AND POPULATION OF DIGITAL INTERFACES DURING PROGRAMMATICALLY ESTABLISHED CHATBOT SESSIONS

TECHNICAL FIELD

The disclosed embodiments generally relate to computer-implemented systems and processes that dynamically configure and populate digital interfaces during programmatically established chatbot sessions.

BACKGROUND

Many financial institutions, online retailers, and other businesses use chatbots to increase and improve a level of customer engagement between customers and corresponding digital platforms such as, but not limited to, websites, messaging applications, and mobile applications. These existing chatbots may receive a message from a customer's device (e.g., provided as input to a corresponding digital interface), programmatically generate responses to the received message, and generate and transmit, to the customer's device, a response to the received message for presentation within the digital interface.

SUMMARY

In some examples, an apparatus includes a communications interface, a memory storing instructions, and at least one processor coupled to the communications interface and to the memory. The at least one processor is configured to execute the instructions to generate first messaging data that includes a candidate input value for a first interface element of a digital interface, and transmit the first messaging data to a device via the communications interface. The first messaging data is transmitted during a communications session established with an application program executed by the device. The at least one processor is further configured to execute the instructions to receive, via the communications interface, second messaging data from the device during the established communications session. The second messaging data includes a confirmation of the candidate input value, and the second message data is generated by the executed application program. Based on the second messaging data, the at least one processor is further configured to execute the instructions to generate first populated interface data that associates the first interface element with the confirmed candidate input value, and store the populated interface data within a portion of the memory.

In other examples, a computer-implemented method includes, using at least one processor, generating first messaging data that includes a candidate input value for a first interface element of a digital interface, and transmitting the first messaging data to a device via the communications interface. The first messaging data is transmitted during a communications session established with an application program executed by the device. The computer-implemented method also includes receiving, using the at least one processor, second messaging data from the device during the established communications session. The second messaging data includes a confirmation of the candidate input value, and the second message data is generated by the executed application program. Based on the second messaging data, the computer-implemented method includes generating, using the at least one processor, first populated interface data that associates the first interface element with the confirmed candidate input value, and storing, using the at least one processor, the populated interface data within a portion of a data repository.

Further, in some examples, a tangible, non-transitory computer-readable medium stores instructions that, when executed by at least one processor, cause the at least one processor to perform a method that includes generating first messaging data that includes a candidate input value for a first interface element of a digital interface, and transmitting the first messaging data to a device via the communications interface. The first messaging data is transmitted during a communications session established with an application program executed by the device. The method also includes receiving second messaging data from the device during the established communications session. The second messaging data includes a confirmation of the candidate input value, and the second message data is generated by the executed application program. Based on the second messaging data, the method includes generating first populated interface data that associates the first interface element with the confirmed candidate input value, and storing the populated interface data within a portion of a data repository.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
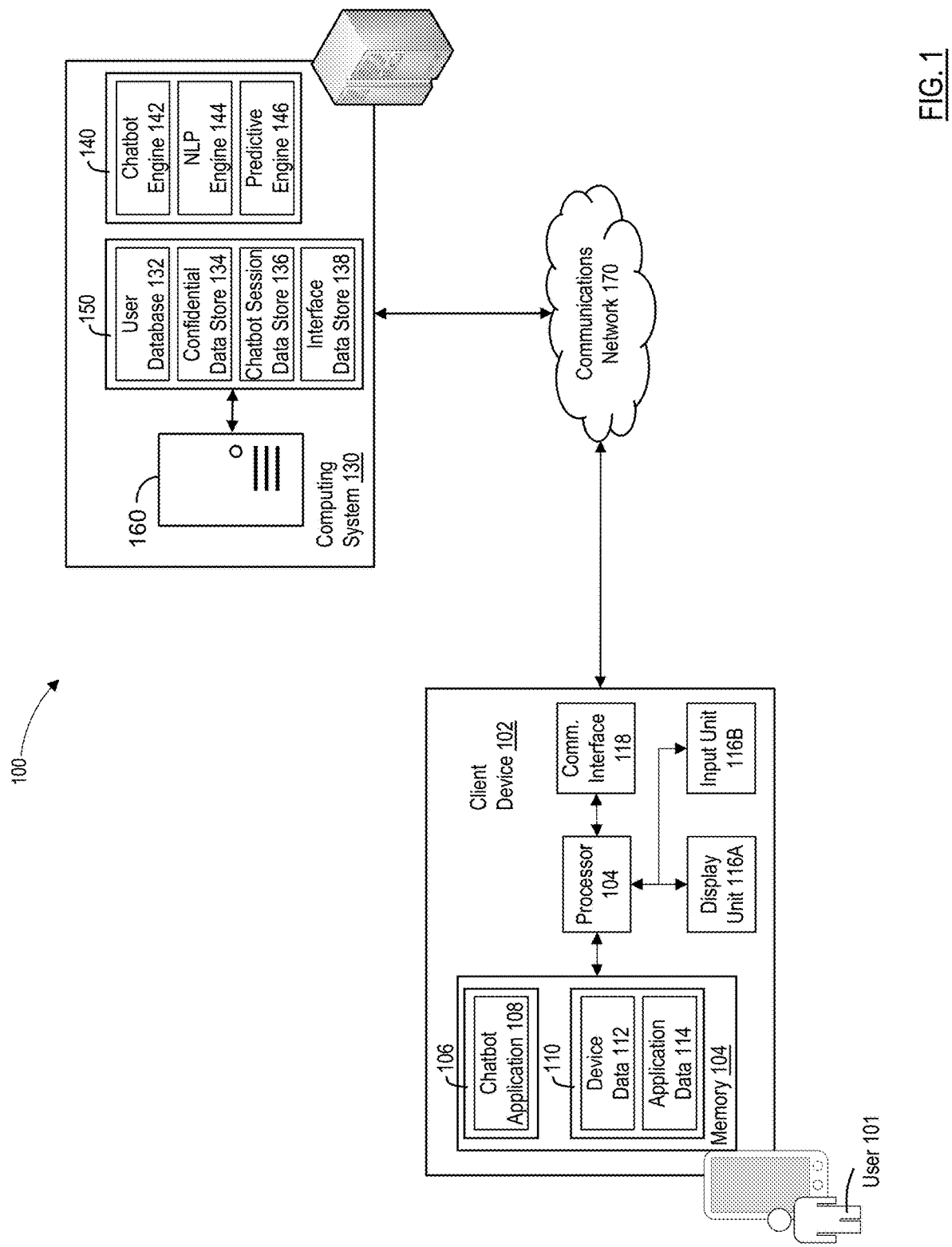
FIG. 1 is a block diagram of an exemplary computing environment, in accordance with some embodiments.

This specification relates to computer-implemented processes that, among other things, dynamically configure and populate a digital interface based on sequential elements of message data exchanged during a chatbot session established programmatically between a network-connected computing system and a participating device operating within a computing environment.

By way of example, and during the programmatically established chatbot session, the computing system may detect a request to access the digital interface at the participating device based on one or more elements of the exchanged message data. In some instances, the requested digital interface may include interface elements that extend across multiple display screens or windows when rendered for presentation at the participating device. Based on the detected request, the computing system may access locally maintained interface data that characterizes the requested digital interface, which may include, but is not limited to, layout data specifying a sequential disposition of each of the interface elements across the multiple display screens, and metadata that specifies an appropriate type or format of input data associated with each of the interface elements (e.g., a numerical value, an expected range of values, etc.).

In some exemplary embodiments, described herein, the computing system may perform operations that dynamically predict a candidate value representing a likely input to a first one of the sequentially disposed interface elements (e.g., a "first" interface element), and generate an additional element of message data that provisions the candidate input value to a chatbot interface generated by the participating device, e.g., a digital interface presented on a display unit of the participating device during the programmatically established chatbot session. Based on additional input provided to the chatbot interface, the participating device may generate and transmit additional message data to the computing system that includes a confirmation of, or a modification to, candidate input value, and the computing system may perform operations that generate an element of populated interface data for the first interface element that includes the confirmed or modified input value, e.g., that "populates" the corresponding interface element within the specified input value or the now-confirmed candidate value.

Through a sequential application of these exemplary processes to each of the sequentially disposed interface elements within the requested digital interface, the computing system may populate fully the requested digital interface without requiring the rendering and presentation of the interface elements by the participating system, and based on further message data transmitted through the chatbot session, may initiate a performance of additional operations associated with the populated interface data. Certain of the exemplary processes described herein, which generate the elements of populated interface data and perform additional operations associated with the populated interface data based on message data exchanged during a programmatically established chatbot session, may be implemented in addition to, or as an alternate to, certain processes that transmit the interface elements to the participating device for rendering and presentation within the digital interface. As such, these exemplary processes, as described herein, may enhance an ability of a user to interact with these complex digital interfaces through devices having display units or input units of limited functionality, such as smart phones, wearable devices, and digital assistants.

I. Exemplary Computing Environments

FIG. 1 is a diagram illustrating an exemplary computing environment 100 that includes a computing system 130 and a client device 102, each of which are operatively connected to communications network 120. Examples of network 120 include, but are not limited to, a wireless local area network (LAN), e.g., a "Wi-Fi" network, a network utilizing radio-frequency (RF) communication protocols, a Near Field Communication (NFC) network, a wireless Metropolitan Area Network (MAN) connecting multiple wireless LANs, and a wide area network (WAN), e.g., the Internet. Although not shown, computing environment 100 may include additional devices, such as one or more additional client devices 102, and additional network-connected computing systems, such as one or more computing systems that store elements of confidential data on behalf of corresponding users.

Client device 102 may include a computing device having one or more tangible, non-transitory memories that store data and/or software instructions, such as memory 105 that stores application repository 106. Examples of these software instructions may include, but are not limited to, one or more application programs, application modules, and other elements of executable code. Client device 102 may also include one or more processors, such as processor 104, configured to execute the software instructions to perform any of the exemplary processes described herein.

As illustrated in FIG. 1, client device 102 may maintain, within application repository 106, an executable chatbot application 108. Chatbot application 108 may, for example, be associated with a financial institution, a governmental or regulatory entity, or another business entity, such as a retailer. Further, chatbot application 108 may be provisioned to client device 102 by computing system 130, and upon execution by processor 104, may perform any of the exemplary processes described herein to establish and maintain a programmatic communications session with an application program executed by computing system 130 (e.g., a chatbot session programmatically established and maintained with a chatbot associated with a financial institution). Application repository 106 may also include additional executable applications, such as one or more executable web browsers (e.g., Google Chrome™), for example. The disclosed embodiments, however, are not limited to these exemplary application programs, and in other examples, application repository 106 may include any additional or alternate application programs, application modules, or other elements of code executable by client device 102.

Client device 102 may also establish and maintain, within memory 105, one or more structured or unstructured data repositories or databases, such as data repository 110 that includes device data 112 and application data 114. In some instances, device data 112 may include information that uniquely identifies client device 102, such as a media access control (MAC) address of client device 102 or an Internet Protocol (IP) address assigned to client device 102. Application data 114 may include information that facilitates, or supports, an execution of any of the application programs described herein, such as, but not limited to, supporting information that enables executable chatbot application 108 to authenticate an identity of a user operating client device 102, such as user 101. Examples of this supporting information include, but are not limited to, one or more alphanumeric login or authentication credentials assigned to user 101, for example, by computing system 130, or one or more biometric credentials of user 101, such as fingerprint data or a digital image of a portion of user 101's face, or other information facilitating a biometric or multi-factor authentication of user 101. Further, in some instances, application data 114 may include additional information that uniquely identifies one or more of the exemplary application programs described herein, such as a cryptogram associated with chatbot application 108.

Additionally, in some examples, client device 102 may include a display unit 116A configured to present elements to user 101, and an input unit 116B configured to receive input from a user of client device 102, such as user 101. By way of example, display unit 116A may include, but is not limited to, an LCD display unit, and LED display unit, or other appropriate type of display unit, and input unit 116B may include, but is not limited to, a keypad, keyboard, touchscreen, fingerprint scanner, voice activated control technologies, stylus, or any other appropriate type of input unit. Further, in some examples, the functionalities of display unit 116A and input unit 116B may be combined into a single device, such as a pressure-sensitive touchscreen display unit that can present elements (e.g., graphical user interface) and can detect an input from user 101 via a physical touch.

Client device 102 may also include a communications interface 118, such as a wireless transceiver device, coupled to processor 104. Communications interface 118 may be configured by processor 104, and can establish and maintain communications with communications network 120 via a communications protocol, such as WiFi®, Bluetooth®, NFC, a cellular communications protocol (e.g., LTE®, CDMA®, GSM®, etc.), or any other suitable communications protocol.

Examples of client device 102 may include, but are not limited to, a personal computer, a laptop computer, a tablet computer, a notebook computer, a hand-held computer, a personal digital assistant, a portable navigation device, a mobile phone, a smartphone, a wearable computing device (e.g., a smart watch, a wearable activity monitor, wearable smart jewelry, and glasses and other optical devices that include optical head-mounted displays (OHMDs)), an embedded computing device (e.g., in communication with a smart textile or electronic fabric), and any other type of computing device that may be configured to store data and software instructions, execute software instructions to perform operations, and/or display information on an interface module, consistent with disclosed embodiments. In some instances, user 101 may operate client device 102 and may do so to cause client device 102 to perform one or more operations consistent with the disclosed embodiments.

Referring back to FIG. 1, computing system 130 may represent a computing system that includes one or more servers 160 and tangible, non-transitory memory devices storing executable code and application modules. Further, the one or more servers 160 may each include one or more processor-based computing devices, which may be configured to execute portions of the stored code or application modules to perform operations consistent with the disclosed embodiments. Additionally, in some instances, computing system 130 can be incorporated into a single computing system. In other instances, computing system 130 can be incorporated into multiple computing systems.

For example, computing system 130 may correspond to a distributed system that includes computing components distributed across one or more networks, such as communications network 120, or other networks, such as those provided or maintained by cloud-service providers (e.g., Google Cloud™, Microsoft Azure™, etc.). In other examples, also described herein, the distributed computing components of computing system 130 may collectively perform additional, or alternate, operations that establish an artificial neural network capable of, among other things, adaptively and dynamically processing portions of model input to predict candidate input values associated with corresponding interface elements, or corresponding combinations of interface elements, within a digital interface. The disclosed embodiments are, however, not limited to these exemplary distributed systems, and in other instances, computing system 130 may include computing components disposed within any additional or alternate number or type of computing systems or across any appropriate network.

In some instances, computing system 130 may be associated with, or may be operated by, a financial institution that provides financial services to customers, such as, but not limited to user 101. Further, and as described herein, computing system 130 may also be configured to provision one or more executable application programs to network-connected devices operable by these customers, such as, but not limited to, executable chatbot application 108 provisioned to client device 102.

To facilitate a performance of these and other exemplary processes, such as those described herein, computing system 130 may maintain, within one or more tangible, non-transitory memories, a data repository 150 that includes, but is not limited to, a user database 132, a confidential data store 134, chatbot session data store 136, and an interface data store 138. For example, user database 132 may include structured or unstructured data records that identify and characterize one or more users of computing system 130, e.g., user 101. For example, and for each of the users, the data records of user database 132 may include a corresponding user identifier (e.g., an alphanumeric login credential assigned to user 101 by computing system 130), and data that uniquely identifies one or more devices (such as client device 102) associated with or operable by user 101 (e.g., a unique device identifier, such as an IP address, a MAC address, a mobile telephone number, etc., that identifies client device 102).

Further, the data records of user database 132 may also link each user identifier (and in some instances, the corresponding unique device identifier) to one or more elements of profile information corresponding to user 101 and others users of computing system 130, e.g., user 101. By way of example, the elements of profile information that identify and characterize each of the users of computing system 130 may include, but are not limited to, a full name of each of the users and contact information associated with each user, such as, but not limited to, a mailing address, a mobile number, or an email address. In other examples, the elements of profile data may also include values of one or more demographic characteristics exhibited by or associated with corresponding ones of the users, such as, but not limited to, an age, a gender, a profession, or a level of education characterizing each of the users.

Confidential data store 134 may include structured or unstructured data that characterizes an interaction between one or more of the users of computing system 130, such as user 101, and the financial institution associated with computing system 130. For example, confidential data store 134 may include confidential account data and confidential transaction data that identify and characterize a balance or transaction history of one or more payment instruments, deposit accounts, brokerage accounts, or other financial services accounts issued to user 101 by the financial institution associated with computing system 130. In some instances, each of the elements of confidential account and transaction data may be associated with a unique identifier of a corresponding user (e.g., an alphanumeric login credential assigned to user 101) or a unique identifier of a device associated with that corresponding user (e.g., an IP address, MAC address, or mobile telephone number of client device 102). As such, each of the elements of confidential account and transaction data may be associated with, or linked to, a corresponding data record within user database 132.

Chatbot session data store 136 may include structured or unstructured data records that identify and characterize one or more programmatic exchanges of data during chatbot sessions initiated by, or on behalf of, one or more users of computing system 130, such as user 101. For instance, the data records of chatbot session data store 136 may include session data related to one or more previous chatbot sessions established programmatically between an application program executed by client device 102 (e.g., chatbot application 108, as described herein) and computing system 130. By way of example, and for a particular one of these previously established chatbot sessions, the data records of chatbot session data store 136 may include, but are not limited to, information that identifies a party that initiated or participates in that previously established chatbot session (e.g., a login credential associated with user 101, a device identifier of client device 102, a unique identifier of an executed application program, such as an application cryptogram, etc.), a time or date associated with the previously established chatbot session, or a duration of that established chatbot session. In other instances, and for the particular one of these previously established chatbot sessions, the data records of chatbot session databases 136 may also include raw or processed information that identifies and characterizes the data exchanged programmatically between client device 102 (e.g., by executed chatbot application 108) and computing system 130.

Interface data store 138 may include data records that identify and characterize one or more digital interfaces that, when populated and provisioned to application programs executed by network-connected devices and systems within environment 100, facilitate an initiation or execution of one or more exchanges of data by computing system 130. In some instances, the data records of interface data store 138 may, for each of the one or more digital interfaces, include: (i) an interface identifier (e.g., an interface name, an interface type, an alphanumeric identifier, etc.); (ii) layout data that identifies one or more discrete interface elements (e.g., fillable text boxes, sliding interface elements, etc.) and that specifies a sequential position of the discrete interface elements within corresponding ones of the digital interfaces; and (ii) corresponding elements of information, e.g., metadata, that characterize a type or range of input data associated with each of the discrete interface elements.

For instance, at least a subset of the digital interfaces may be associated with an application for one or more financial products or services capable of provisioning to user 101 by the financial system associated with computing system 130. Examples of these digital interface include, but are not limited to, digital interfaces that support an application by user 101 for a mortgage product offered by the financial institution, an application by user 101 for a line of credit or a credit card offered by the financial institution, or an application by user 101 to establish a personal or business banking relationship with the financial institution. Additional examples of these digital interface may include, but are not limited to, an additional digital interface enable user 101 to complete one or more tax forms (e.g., a tax return and associated schedules), or an additional digital interface that enables user 101 to request or qualify for one or more governmental or legal services (e.g., a juror qualification form, etc.).

Furthermore, computing system 130 may perform operations that store, within interface data store 138, elements of populated interface data provisioned to or obtained from client device 102, e.g., as obtained through data programmatically exchanged with executed chatbot application 108 using any of the exemplary processes described herein. Further, computing system 130 may associate each of the stored elements of populated interface data with the corresponding interface identifier (or identifiers) and with corresponding elements of the layout data and the metadata, which may facilitate a generation of one or more populated digital interfaces data programmatically exchanged with executed chatbot application 108 during the chatbot sessions described herein, e.g., without requiring any rendering of the interface elements across multiple display screens.

Referring back to FIG. 1, computing system 130 may also maintain, within the one or more tangible, non-transitory memories, one or more executable application programs 140, such as, but not limited to, a chatbot engine 142, a natural language processing (NLP) engine 144, and a predictive engine 146. When executed by computing system 130 (e.g., by the one or more processors of computing system 130), chatbot engine 142 can perform operations that establish an interactive chatbot session with an application program executed by a network-connected device, such as chatbot application 108 executed by client device 102. For example, chatbot engine 142 may perform, either alone or in combination with NLP engine 144, any of the exemplary processes described herein to process message data received from client device 102 (e.g., based on input provided to a digital interface generated and presented by client device 102), to adaptively and dynamically parse the message data to establish a meaning and/or a context of the message data and further, to generate and provision, to the chatbot interface generated by chatbot application 108 executed by client device 102, a response to the message data via a secure, programmatic interface. In some instances, when presented to user 101 on the chatbot interface (e.g., via display unit 116A of client device 102), the presented response may simulate an ongoing and contextually relevant dialog between user 101 and an artificially and programmatically generated chatbot.

When executed by computing system 130, NLP engine 144 may apply one or more natural language processing (NLP) algorithms to portions of received message data. Based on the application of these adaptive, statistical, or dynamic natural language processing algorithms, NLP engine 144 may parse the received message data to identify one or more discrete linguistic elements (e.g., a word, a combination of morphemes, a single morpheme, etc.), and to generate contextual information that establishes the meaning or a context of one or more discrete linguistic elements.

Examples of these NLP algorithms may include one or more machine learning processes, such as, but not limited to, a clustering algorithm or unsupervised learning algorithm (e.g., a k-means algorithm, a mixture model, a hierarchical clustering algorithm, etc.), a semi-supervised learning algorithm, or a decision-tree algorithm. In other examples, the one or more NLP algorithms may also include one or more artificial intelligence models, such as, but not limited to, an artificial neural network model, a recurrent neural network model, a Bayesian network model, or a Markov model. Further, the one or more NLP algorithms may also include one or more statistical processes, such as those that make probabilistic decisions based on attaching real-valued weights to elements of certain input data.

Certain of these exemplary statistical processes, machine learning processes, or artificial intelligence models can be trained against, and adaptively improved using, training data having a specified composition, which may be extracted from portions of user database 132, confidential data store 134, and/or a chatbot session data store 136, and can be deemed successfully trained and ready for deployment when a model accuracy (e.g., as established based on a comparison with the outcome data), exceeds a threshold value. Further, although chatbot engine 142 and NLP engine 144 are distinctly shown in FIG. 1, in some examples, the functions of NLP engine 144 may be performed by chatbot engine 142 (e.g., NLP engine 144 is part or component of chatbot engine 142).

In some instances, executed predictive engine 146 may perform operations that dynamically and adaptively determine candidate values appropriate for corresponding interface elements of a digital interface, e.g., as requested by user 101 based on data exchanged programmatically between executed chatbot engine 142 and executed chatbot application 108 during any of the exemplary chatbot sessions described herein. For example, the candidate input value associated with a particular one of the interface elements may be consistent with the input data type or range of input values associated the particular interface element. Further, and in some examples, predictive engine 146 may compute the candidate value for that particular interface elements based on an application of one or more deterministic or stochastic statistical processes, one or more machine learning processes, or one or more artificial intelligence models to structured model input that includes, but is not limited to, all or selected portion of the metadata associated with the particular interface element, selected elements of confidential data maintained on behalf of user 101 within confidential data store 134, or selected elements of chatbot session data involving user 101 and maintained within chatbot session data store 136.

For example, the deterministic statistical processes can include, but are not limited to, a linear regression model, a nonlinear regression model, a multivariable regression model, and additionally, or alternatively, a linear or nonlinear least-squares approximation. Examples of the stochastic statistical processes can include, among other things, a support vector machine (SVM) model, a multiple regression algorithm, a least absolute selection shrinkage operator (LASSO) regression algorithm, or a multinomial logistic regression algorithm, and examples of the machine learning processes can include, but are not limited to, an association-rule algorithm (such as an Aprion algorithm, an Eclat algorithm, or an FP-growth algorithm) or a clustering algorithm (such as a hierarchical clustering process, a k-means algorithm, or other statistical clustering algorithms). Further, examples of the artificial intelligence models include, but are not limited to, an artificial neural network model, a recurrent neural network model, a Bayesian network model, or a Markov model. In some instances, these stochastic statistical processes, machine learning algorithms, or artificial intelligence models can be trained against, and adaptively improved using, training data having a specified composition, which may be extracted from portions of user database 132, confidential data store 134, and/or chatbot session data store 136, along with corresponding outcome data, and can be deemed successfully trained and ready for deployment when a model accuracy (e.g., as established based on a comparison with the outcome data), exceeds a threshold value.

II. Exemplary Computer-Implemented Processes that Dynamically Configure, Populate, and Provision Digital Interfaces using Programmatically Established Chatbot Sessions In some examples, to initiate a chatbot session with computing system 130, user 101 may provide input to client device 102 (e.g., via input unit 116B) that requests an execution of a corresponding application program, such as chatbot application 108 of FIG. 1. For example, upon execution by client device 102, chatbot application 108 may generate and render one or more interface elements for presentation within a corresponding digital interface, such as through display unit 116A. In some examples, the digital interface may include interface elements that prompt user 101 to provide, via input unit 116B, input that specifies a corresponding login credential (e.g., an alphanumeric login credential of user 101, etc.) and one or more corresponding authentication credentials (e.g., an alphanumeric password of user 101, a biometric credential of user 101, etc.).

Based on the provided login and authentication credentials, executed chatbot application 108 may perform operations that authenticate an identity of user 101 based on copies of locally stored login and authentication credentials (e.g., as maintained within corresponding portions of device data 112 and application data 114) or based on data exchanged with one or more network-connected computing systems, such as computing system 130. Further, and in response to a successful authentication of the identity of user 101, executed chatbot application 108 may perform operations that package a unique identifier of user 101 (e.g., the login credential), a unique identifier of client device 102 (e.g., an IP or MAC address extracted from device data 112) into corresponding portions of a request to initiate a chatbot session with computing system 130. In some instances, executed chatbot application 108 may also package data confirming a successful authentication of the identity of user 101, such as an application cryptogram (e.g., extracted from, or generated in accordance with data maintained in, application data 114) into an additional portion of the request.

Client device 102 may transmit the generated request across network 120 to computing system 130, e.g., via a secure programmatic interface. The secure programmatic interface may receive the generated request, and may relay the generated request to chatbot engine 142 of computing system 130, which may perform operations that parse the request and extract the user identifier and the device identifier (and in some instances, the data confirming the successful authentication of the identity of user 101). In some instances, chatbot engine 142 may process the extracted data (e.g., the user identifier, the device identifier, and/or the confirmation data), and verify an authenticity or an integrity of the received request based on the device identifier or the confirmation data. Based on the verified authenticity or integrity, chatbot engine 142 may perform operations that initiate a chatbot session with executed chatbot application 108, and that generate an additional data record within chatbot session data store 136 that identifies and characterizes the initiated chatbot session.

By way of example, the newly generated data record may include the user identifier and the device identifier (and in some instances, the confirmation data), and may further include a time or date at which chatbot engine 142 initiated the chatbot session. Further, in some instances, chatbot engine 142 may perform operations that generate an initial, introductory message for the chatbot session based on, among other things, one or more predetermined rules that specify appropriate introductory messages, the time or date of initiation, and additionally, or alternatively, the user or device identifiers. For example, the introductory message may include textual content that includes a greeting and that prompts user 101 to further interact with the established chatbot session (e.g., "Good morning! How can we help you?), and chatbot engine 142 may perform operations that generate introductory message data specifying the introductory message, and that transmit the introductory message data across network 120 to client device 102, e.g., through a secure programmatic interface. Chatbot engine 142 may also perform operations that store the introductory message data within the newly generated data record that identifies the chatbot session within chatbot session data store 136, and that associate the message data with the user identifier, the device identifier, and additionally, or alternatively, the confirmation data.

In some instances, client device 102 may receive the message data via the secure programmatic interface, which may route the introductory message data to executed chatbot application 108. In response to the receipt of the introductory message data, executed chatbot application 108 may generate and render for presentation a digital interface, e.g., a chatbot interface, that includes the introductory message data and facilitates an ongoing and simulated conversation between user 101 and a programmatically generated chatbot maintained by computing system 130, as described below in FIG. 2A.

Figure 2B:
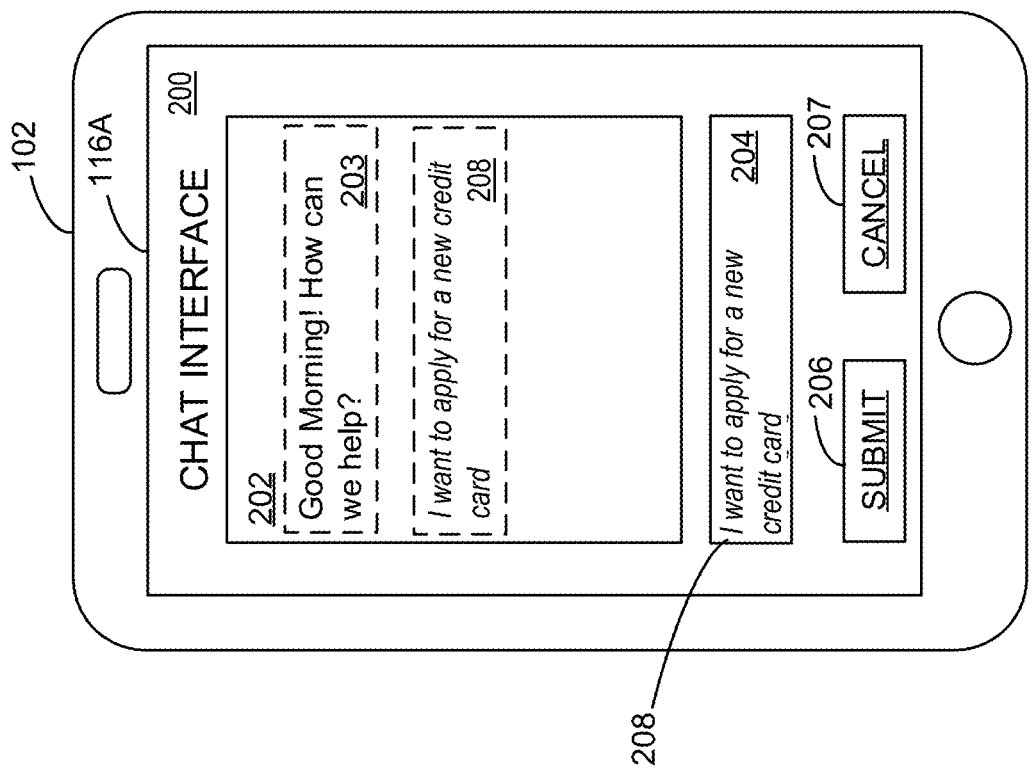
FIGS. 2A and 2B are diagrams illustrating portions of an exemplary graphical user interface, in accordance with some embodiments.
Figure 2A:
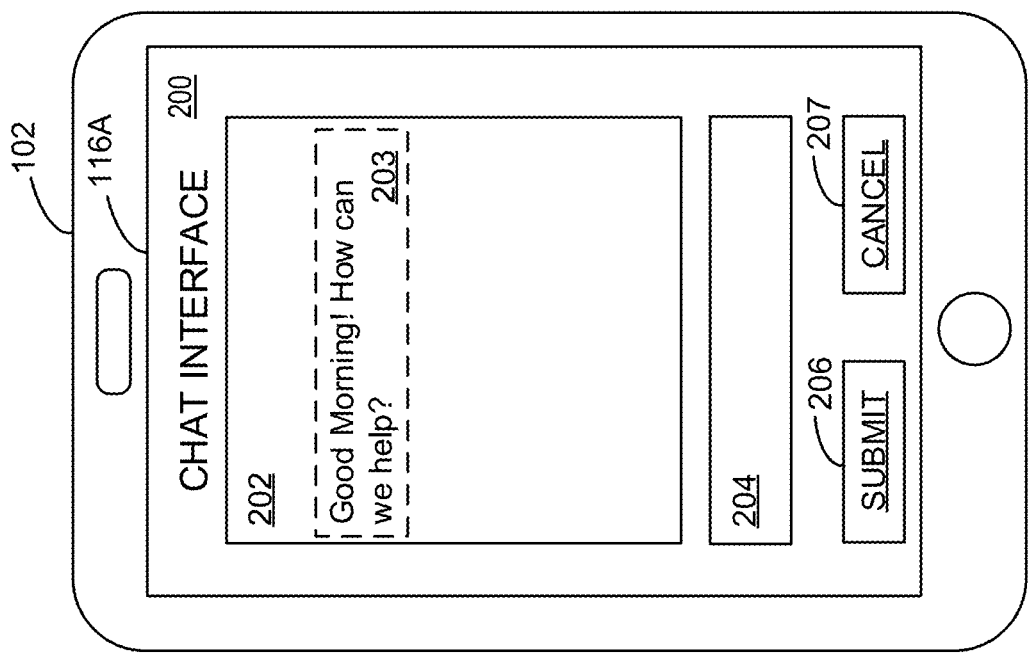

Referring to FIG. 2A, client device 102 may present chatbot interface 200 on a corresponding portion of display unit 116A. In some instances, chatbot interface 200 may include a chatbot session area 202, which displays a summary of a current chatbot session, and fillable text box 204 allows user 101 to provide input that, after selection of icon 206 (e.g., via input unit 116B), will be shown in chatbot session area 202. In some instances, executed chatbot application 108 may perform operations that present all or a portion of the introductory message data for presentation within chatbot interface 200, and as illustrated in FIG. 2A, chatbot session area 202 may include introductory message 203 (e.g., "Good Morning! How can we help?"). The automatic presentation of introductory message 203 may simulate a conversation between user 101 and the programmatic chatbot maintained by computing system 130, and as illustrated in FIG. 2A, introductory message greets user 101 and prompts user 101 to further interact with the established chatbot session.

In some examples, user 101 may elect to apply for a credit card offered by the financial institution, and using any of the exemplary processes described herein, user 101 may provide input to a fillable text box of chatbot interface 200 (e.g., via client device 102) that requests access to a digital interface associated with the application for the credit card. For instance, display unit 116A may correspond to a pressure-sensitive, touchscreen display unit, and user 101 may provide input to fillable text box 204, e.g., via a miniaturized "virtual" keyboard presented within digital chatbot interface 200, that specifies message 208, e.g., "I want to apply for a new credit card."

In other instances, the input to fillable text box 204 may include audio content representative of a spoken utterance of message 208, which may be captured by a corresponding microphone embedded into client device 102 (e.g., as a portion of input unit 116B) or in communication with client device 102 (e.g., across a short-range communications channel, such as Bluetooth™, etc.). Executed chatbot application 108 may receive the audio content and, based on an application of one or more speech recognition algorithms or natural language processing (NLP) algorithms to the audio content, convert the audio content into text corresponding to message 208.

Referring to FIG. 2B, executed chatbot application 108 may process the received input, and may present message 208 within a corresponding portion of fillable text box 204. Further, user 101 may provide additional input to client device 102 that requests a submission of message 208 to the established chatbot session by selecting "Submit" icon 206 (e.g., by establishing contact between a portion of a finger or a stylus and a corresponding portion of a surface of display unit 116A that corresponds to icon 206, or by uttering one or more predetermined phrases associated with icon 206, which may be captured by any of the exemplary microphones described herein). Executed chatbot application 108 may detect the provided additional input, which requests the submission of message 208 to the established chatbot session, and may perform operations that present all or a portion of message 208 within chatbot session area 202. In other instances, user 101 may provide input to input unit 116B that selects "Cancel" icon 207, the detection of which causes executed chatbot application 108 to clear any text currently in fillable text box 204 and prevent a submission of message 208.

In response to the additional user input that selects "Submit" icon 206, executed chatbot application 108 may perform operations that package all or a portion of message 208 into corresponding portions of session data, along with the unique identifier of user 101 (e.g., the alphanumeric login credential) and additionally, or alternatively, the unique device identifier (e.g., the IP or MAC address of client device 102 maintained within device data 112). Further, and as described herein, executed chatbot application 108 may also include, within a portion of the received message data, an application cryptogram that identifies executed chatbot application 108, e.g., as extracted from application data 114. Executed chatbot application 108 may perform operations that cause client device 102 to transmit all or a portion of the generated session data across network 120 to computing system 130, e.g., using any appropriate communications protocol.

Figure 3:
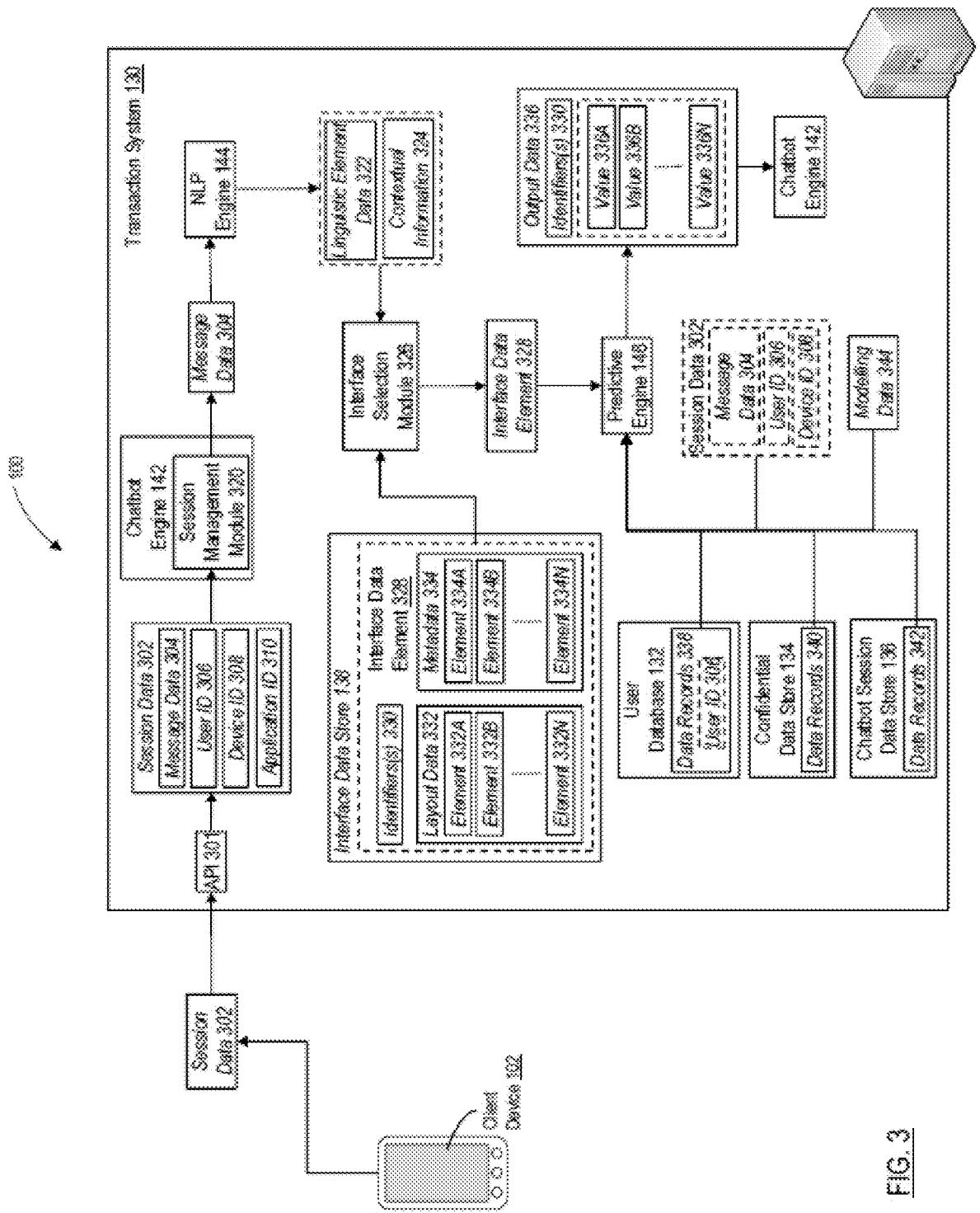
FIGS. 3 and 4A are diagrams illustrating portions of an exemplary computing environment, in accordance with some embodiments.

Referring to FIG. 3, a secure programmatic interface of computing system 130, e.g., application programming interface (API) 301 associated with executed chatbot engine 142, may receive session data 302 from client device 102. In some instances, and as described herein, session data 302 may include message data 304, which includes textual content representative of message 208 provided by user 101 as an input to chatbot interface 200 of FIG. 2B (e.g., "I want to apply for a new credit card"). Session data 302 may also include an identifier 306 of user 101 (e.g., an alphanumeric login credential, etc.) and an identifier 308 of client device 102 (e.g., an IP or MAC address, etc.). Further, session data 302 may include a unique identifier of executed chatbot application 108 (e.g., an application cryptogram) that, in some instances, may enable computing system 130 to verify an authenticity of session data 302.

In some instances, API 301 may be associated with or established by executed chatbot engine 142, and may facilitate secure, programmatic communications across network 120 between chatbot engine 142 (e.g., as executed by computing system 130) and chatbot application 108 (e.g., as executed by client device 102). As illustrated in FIG. 3, API 301 may receive and route session data 302 to a session management module 320 of executed chatbot engine 142, which may parse session data 302 to extract one or more of user identifier 306, device identifier 308, or application identifier 310. Session management module 320 may also perform operations (not illustrated in FIG. 3) that verify an authenticity of session data 302 based on user identifier 306 (e.g., that user identifier 306 matches a corresponding identifier within user database 132, etc.), device identifier 308 (e.g., based on a determination that the device identifier is associated with user identifier 306 within user database 132, etc.), application identifier 310 (e.g., that the application-specific cryptogram is associated with an expected structure or format, etc.).

In response to successful verification, session management module 320 may perform operations that store session data 302 within one or more tangible, non-transitory memories, e.g., within a portion of chatbot session data store 136 associated with the established chatbot session between executed chatbot engine 142 and executed chatbot application 108. Session management module 320 may perform operations that generate a programmatic command that executes NLP engine 144, e.g., as provided through a corresponding programmatic interface, and that provides all or a portion of message data 304 as an input to executed NLP engine 144. In other instances (not illustrated in FIG. 3), and in response to an unsuccessful verification, session management module 320 may perform operations that generate and transmit, across network 120 to client device 102, an error message indicative of the failed verification, and that discard session data 302.

Referring back to FIG. 3, NLP engine 144 may receive message data 304, and may apply any of the exemplary NLP algorithms described herein to all or a portion of message data 304. Based on the application of these natural language processing algorithms, NLP engine 144 may identify one or more discrete linguistic elements (e.g., a word, a combination of morphemes, a single morpheme, etc.) within message data 304, and may establish a context and a meaning of combinations of the discrete linguistic elements, e.g., based on the identified discrete linguistic elements, relationships between these discrete linguistic elements, and relative positions of these discrete linguistic elements within message data 304. In some instances, NLP engine 144 may generate linguistic element data 322, which includes each discrete linguistic element, and contextual information 324 that specifies the established context or meaning of the combination of the discrete linguistic elements.

As described herein, message data 304 may be representative of message 208 provided by user 101 as an input to chatbot interface 200 of FIG. 2, e.g., "I want to apply for a new credit card." Based on the application of the exemplary NLP algorithms described herein to message data 304, NLP engine 144 may parse message data 304 and extract discrete linguistic elements (e.g., discrete words) that include, but are not limited to, "I," "want," "to," "apply," "for," "a," "new," "credit," and "card," each of which may be packaged into a corresponding portion of linguistic element data 322. Further, and based on any of these exemplary natural language processing algorithms described herein to the discrete linguistic elements, e.g., alone or in combination, NLP engine 144 may determine that message 208 corresponds to a request to access a digital interface associated with, and facilitating, the application for that new credit card, and may package contextual data indicative of the determination into a corresponding portion of contextual information 324. In some instances, the contextual data may characterize a nature or purpose of message 208 (e.g., the request for the digital interface) and may include one or more identifiers associated with the requested digital interface, e.g., that enable computing system 130 to access elements of locally maintained interface data associated with the requested digital interface.

Executed NLP engine 144 may provide linguistic element data 322 and contextual information 324 as inputs to an interface selection module 326 that, when executed by computing system 130, performs any of the exemplary processes described herein to identify the digital interface requested by message. e.g., based on portions of linguistic element data 322 or contextual information 324, and to extract one or more locally maintained elements of interface data associated with the identified digital interface, e.g., as maintained within interface data store 138 of data repository 150. By way of example, and as described herein, the extracted elements of interface data main include, for the identified digital interface: (i) layout data that identifies one or more discrete interface elements (e.g., fillable text boxes, sliding interface elements, etc.) and that specifies a sequential position of the discrete interface elements within the digital interface; and (ii) corresponding elements of information, e.g., metadata, that characterize a type or range of input data associated with each of the discrete interface elements.

As illustrated in FIG. 3, interface selection module 326 may receive linguistic element data 322 or contextual information 324, e.g., as outputs from NLP engine 144, and may perform operations that store linguistic element data 322 and contextual information 324 within one or more tangible, non-transitory memories, e.g., within a portion of chatbot session data store 136 that includes session data 302. Further, interface selection module 326 may access interface data store 138, and may perform operations that, based on portions of linguistic element data 322 and/or contextual information 324, identify one or more elements of the locally maintained interface data that are associated with digital interface requested in message 208, e.g., the digital interface associated with the application for the new credit card.

By way of example, executed interface selection module 326 may access an element 328 of digital interface data maintained within interface data store 138. Interface data element 328 may be associated with a particular digital interface associated with, available to, or provisionable to user devices by computing system 130, and interface data element 328 may include one or more interface identifiers 330 of the particular digital interface (e.g., an interface name or an interface type, etc.), along with layout data 332 and metadata 334 associated with the particular digital interface.

As described herein, layout data 332 may also include discrete data elements (e.g., layout data elements 332A, 332B, . . . , 332N of FIG. 3), each of which identify and characterize a corresponding one of the interface elements of the particular digital interface (e.g., fillable text boxes, sliding interface elements, etc.) and further, specify a sequential position of the corresponding interface element within the particular digital interface. For example, each of the discrete data elements of layout data 332 may include indexing information (e.g., a flag, etc.) that specifies the sequential position of the corresponding interface element within the particular digital interface and in some instances, identifies an dependency or a relationship between an input value of the corresponding interface element and input values of other interface elements within the particular digital interface (e.g., a value of a total income may correspond to a summation of wages and investment income, etc.). Further, each of the discrete elements of layout data 332 (e.g., layout data elements 332A, 332B, . . . 332N), may also be associated with a corresponding element of metadata 334 (e.g., metadata elements 334A, 334B, . . . 334N of FIG. 3), which characterizes a type or range of input data associated with the corresponding interface element.

Based on a comparison between interface identifiers 330 and the portions of contextual information 324 and/or linguistic element data 322, executed interface selection module 326 may determine that the particular digital interface associated with interface data element 328 represents the digital interface requested by message 208, e.g., that the particular digital interface corresponds to the requested digital interface for the credit card application. For instance, contextual information 324 may include data that identifies an interface type associated with the requested digital interface (e.g., the credit card application), and may also identify the particular credit card referenced in message 208. In some examples, executed interface selection module 326 may parse interface identifiers 330, and based on a determination that at least one of interface identifiers 330 include or reference the interface type or the particular credit card, establish that interface data element 328 is associated with the digital interface requested by message 208. Executed interface selection module 326 may perform operations that extract interface data element 328 from interface data store 138, and provide interface data element 328 as an input to predictive engine 146 that, when executed by computing system 130, performs any of the exemplary processes described to compute a candidate input value for each of the interface elements within the requested digital interface based on, among other things, corresponding elements of layout data 332 and metadata 334.

In other examples, executed interface selection module 326 may determine that none of the elements of interface data maintained within interface data store 138 are associated with, or representative of, the requested digital interface, or that multiple elements of interface data maintained within interface data store 138 are potentially associated with, or potentially representative of, the requested digital interface (e.g., based on ambiguities in the potions of contextual information 324 and/or linguistic element data 322, etc.). Based on the determined lack of interface data elements associated with the requested digital interface, or based on the determined plurality of interface data elements potentially associated with the requested digital interface, executed interface selection module 326 may generate and transmit programmatically an error flag to executed chatbot engine 142 (not illustrated in FIG. 3), which may perform additional operations that clarify user 101's request based on additional message data programmatically exchanged with executed chatbot application 108 during the existing chatbot session (also not illustrated in FIG. 3).

Referring back to FIG. 3, executed predictive engine 146 may receive interface data element 328, may perform operations that parse layout data 332 to identify, and extract an element of layout data 332, e.g., layout data element 332A, and a corresponding element of metadata, e.g., metadata element 334A, associated with a corresponding one of the interface elements disposed at a first sequential position within the requested digital interface, e.g., a "first" interface element. For example, executed predictive engine 146 may perform operations that access the indexing information included within each of the discrete data element of layout data 332, and based on the indexing information, establish that layout data element 332A represents, and is associated with, the first interface element within the requested digital interface.

Executed predictive engine 146 may also parse metadata element 334A to obtain information that characterizing a type, range, or format of input data associated with the first interface element. For example, and based on metadata element 334A, executed predictive engine 146 may establish that input data appropriate to the first interface elements represents a legal name of user 101 (e.g., as specified within a corresponding government-issued identifier, such as a passport), and that the appropriate input data format includes alphanumeric input having a predetermined minimum length (e.g., two characters) and a predetermined maximum length (e.g., sixty-four characters). Executed predictive engine 146 may also perform any of the exemplary processes described herein to compute a candidate input value 336A for the first interface element based on the data type or data format specified within metadata element 334A.

Executed predictive engine 146 may also perform operations that access session data 302 associated with the established chatbot session (e.g., as maintained within chatbot session data store 136), and extract user identifier 306, which identifies user 101 (e.g., the alphanumeric login credential of user 101) and additionally, or alternatively, device identifier 308, which identifies client device 102 (e.g., the IP or MAC address of client device 102). In some instances, executed predictive engine 146 may access user database 132 and identify one or more data records 338 that include, or reference user identifier 306 (and additionally, or alternatively, device identifier 308). Executed predictive engine 146 may perform operations that extract, from data records 338, the legal name of user 101 (e.g., "John Q. Stone") and may package the extracted legal name of user 101 into candidate input value 336A, along with indexing information characterizing the sequential position of the first interface element within the requested digital interface.

In other instances, executed predictive engine 146 may perform additional operations to modify the extracted legal name of user 101 based on the appropriate input data format (e.g., to truncate the extracted legal name in accordance with the predetermined maximum length), and to package the modified legal name of user 101 into candidate input value 336A, along with the indexing information. Further, executed predictive engine 146 may also package candidate input value 336A into a corresponding portion of output data 336 of executed predictive engine 146.

In some examples, executed predictive module 146 may perform any of the exemplary processes described herein to identify and extract an additional element of layout data 332, e.g., layout data element 332B, and a corresponding element of metadata, e.g., metadata element 334B, associated with a corresponding one of the interface elements disposed at a second sequential position within the requested digital interface, e.g., a "second" interface element. As described herein, executed predictive engine 146 may perform operations that access the indexing information included within each of the discrete data elements of layout data 332, and based on the indexing information, establish that layout data element 332B represents, and is associated with, the second interface element within the requested digital interface.

Executed predictive engine 146 may also parse metadata element 334B to obtain information that characterizing a type or range of input data associated with the second interface element. For example, and based on metadata element 334B, executed predictive engine 146 may establish that input data appropriate to the second interface elements represents a current street address of user 101 (e.g., as specified within a corresponding government-issued identifier, such as a passport), and executed predictive engine 146 may perform any of the exemplary processes described herein to identify and extract the current street address of user 101 from data records 338 (e.g., associated with user identifier 306 or device identifier 308 with user database 132), and to package the extracted street address into candidate input value 336B.

The disclosed embodiments are, however, not limited these examples of input data, and in other instances, the additional input data appropriate to the second interface element (or to other sequentially disposed interface elements within the requested digital interface) may include an additional or alternate element of profile data, confidential data, or chatbot session data maintained locally by computing system 130 that is consistent with the input data type or format specified within metadata element 334B. Examples of the additional input data appropriate to the second interface element (or to the other sequentially disposed interface elements within the requested digital interface) may include, but is not limited to, a current or city of residence of user 101, a current zip or postal code of user 101, a current employer of user 101, a birthdate of user 101, or a government-issued identifier held by user 101 (e.g., a driver's license number, a social security number, etc.), and the additional input data may be maintained within data records of one or more of user database 132, confidential data store 134, or chatbot session data store 136, e.g., in conjunction with user identifier 306 or device identifier 308.

In other instances, and in addition to the exemplary processes described herein that extract the appropriate input data from one or more of locally maintained data repositories, predictive engine 146 may also perform operations that dynamically and adaptively predict the additional input data appropriate to the second interface element (or to other sequentially disposed interface elements within the requested digital interface) based on an application of one or predictive models to model input associated with the second interface element (or with others of the sequentially disposed interface elements within the requested digital interface). By way of example, and for the second interface element described herein, the model input may include, but is not limited to, all or a selected portion of metadata element 334B (e.g., that characterizes the type, range, or format of the appropriate input data associated with the second interface element) and additional elements of profile data, confidential data, or chatbot session data associated with user 101 (e.g., as extracted from, or selectively derived from data maintained within, one or more of user database 132, confidential data store 134, or chatbot session data store 136.

The model input may also include elements of profile data, confidential data, or chatbot session data associated with additional users of computing system 130 that are demographically similar to user 101 (e.g., as extracted from, or selectively derived from data maintained within, one or more of user database 132, confidential data store 134, or chatbot session data store 136). Further, in some instances, the model input may include data that characterizes an interaction of these additional users within the requested data interface, e.g., as extracted from, or derived from, corresponding portions of interface data store 138. The disclosed embodiments are, however, not limited to these examples of structured model input, and in other instances, the model input associated with the second interface element (or with any of the other sequentially disposed interface elements within the requested digital interface) may include any additional or alternate data associated with user 101, the additional users, or the interface elements that would be appropriate to the one or more predictive models.

By way of example, and as described herein, the predictive models may be based on one, or more, of a deterministic or stochastic statistical process, a machine learning processes, or an artificial intelligence model. For example, the deterministic statistical process can include, but is not limited to, a linear regression model, a nonlinear regression model, a multivariable regression model, and additionally, or alternatively, a linear or nonlinear least-squares approximation. Examples of the stochastic statistical process can include, among other things, a support vector machine (SVM) model, a multiple regression algorithm, a least absolute selection shrinkage operator (LASSO) regression algorithm, or a multinomial logistic regression algorithm, and examples of the machine learning process can include, but are not limited to, an association-rule algorithm (such as an Apriori algorithm, an Eclat algorithm, or an FP-growth algorithm) or a clustering algorithm (such as a hierarchical clustering process, a k-means algorithm, or other statistical clustering algorithms). Further, examples of the artificial intelligence models include, but are not limited to, an artificial neural network model, a recurrent neural network model, a Bayesian network model, or a Markov model. As described herein, these stochastic statistical processes, machine learning processes, or artificial intelligence models can be trained against, and adaptively improved using, training data having a specified composition and corresponding outcome data, and can be deemed successfully trained and ready for deployment when a model accuracy (e.g., as established based on a comparison with the outcome data), exceeds a threshold value.

As illustrated in FIG. 3, predictive engine 146 may obtain modelling data 344 (e.g., from one or more tangible, non-transitory memories) that specifies a composition and/or a structure of the model input associated with each of the predictive models, as such, corresponding ones of the deterministic or stochastic statistical processes, machine learning processes, or artificial intelligence models. In some examples, as described herein, the structure or composition of model input may be model specific (e.g., tailored to a specific compositional requirement of the deterministic or stochastic statistical processes, machine learning processes, or artificial intelligence models described herein). Additionally, or alternatively, the composition or structure of the model input may be specific to user 101 or to the requested digital interface associated with the credit card application).

In some examples, executed predictive engine 146 may perform operations that generate the model input in accordance with the composition or structure specified by modelling data 344, and may apply the one or more predictive models (e.g., one of more of the deterministic or stochastic statistical processes, machine learning processes, or artificial intelligence models) to each of the discrete elements of the generated model input. Based on the application of the one or more predictive models to discrete elements of input data, executed predictive engine 146 may determine a candidate input value 336B for the second interface element (or for any of the other sequentially disposed interface elements within the requested digital interface). In some instances, executed predictive engine 146 may package the candidate input value, e.g., as predicted based on the application of the one or more predictive models to the generated model input, into corresponding portions of output data 336.

By way of example, the second interface element may be associated with a requested amount of credit associated with the new credit card account, and the one or more predictive models may include an artificial neural network model implemented by the distributed computing components of computing system 130, e.g., as nodes of the artificial neural network. Further, modelling data 344 may associate the artificial neural network model with corresponding elements of model input that include, but are not limited to: a portion of metadata element 334B that identified the appropriate input data (e.g., the requested amount of credit); profile data specifying a current residence of user 101 (e.g., as maintained within data records 338 of user database 132); confidential account data specifying a current balance of one or more financial services accounts issued to user 101 by the financial institution (e.g., as maintained within data records 340 of confidential data store 134); and data characterizing the amounts of credit requested by additional users interacting with the requested digital interface (e.g., as maintained within data records 342 of interface data store 138).

In some instances, executed predictive engine 146 may perform operations that, based on modelling data 344, access and extract the elements of profile data and confidential account data associated with user 101 (e.g., from respective ones of user database 132 and confidential data store 134), identify one or more additional users that are demographically similar to user 101 (e.g., based on detected similarities between portions of the profile data maintained within user database 132), and access and extract the data characterizing the amounts of credit requested by the additional users (e.g., as maintained within interface data store 138). Executed predictive engine 146 may package the portion of metadata element 334B, the extracted profile data and confidential account data associated with user 101, and the extracted data characterizing the amounts of credit requested by the additional users into corresponding portions of the model input, may provide each of the elements of the generated model input to a corresponding one of the nodes of the artificial neural network, e.g., to apply the artificial neural network model to the generated model input.

Based on the application of the artificial neural network model to the generated model input, executed predictive engine 146 predict a candidate amount of credit of $75,000 for user 101, and may package the candidate credit amount of $75,000 into candidate input value 336B, along with indexing information that characterizes the sequential position of the second interface element within the requested digital interface. Further, executed predictive engine 146 may also package candidate input value 336B into a corresponding portion of output data 336, e.g., at a storage location corresponding to the sequential position of the second data element within the requested digital interface.

Further, executed predictive engine 146 may perform any of the exemplary processes described herein to compute a candidate input value for each additional or alternate interface element disposed a corresponding sequential position within the requested digital interface, and may package each of these additional or alternate candidate input values, each of which include indexing information indicative of the sequential position of the corresponding interface element within the digital interface, within a portion of output data 336, e.g., as discrete candidate input values 336A, 336B, . . . 336N. In some instances, executed predictive engine 146 also perform operations that package interface identifiers 330 of the requested digital interface into a corresponding portion output data 336, e.g., within a header portion.

As illustrated in FIG. 3, executed predictive engine 146 may provide output data 336, which includes the discrete candidate input values associated with respective ones of the interface elements within the requested digital interface (e.g., candidate input values 336A, 336B, . . . 336N) and interface identifiers 330, as an input to executed chatbot engine 142. In some instances, described below in reference to FIGS. 4A-4E, executed chatbot engine 142 may perform operations that verify an accuracy of each of the candidate input values based on sequential and successive elements of message data programmatically exchanged with executed chatbot application 108 during the established chatbot session, and that populate the interface elements of the requested digital interface (e.g., the digital interface associated with the credit card application) based on corresponding ones of the verified input values.

Figure 4A:
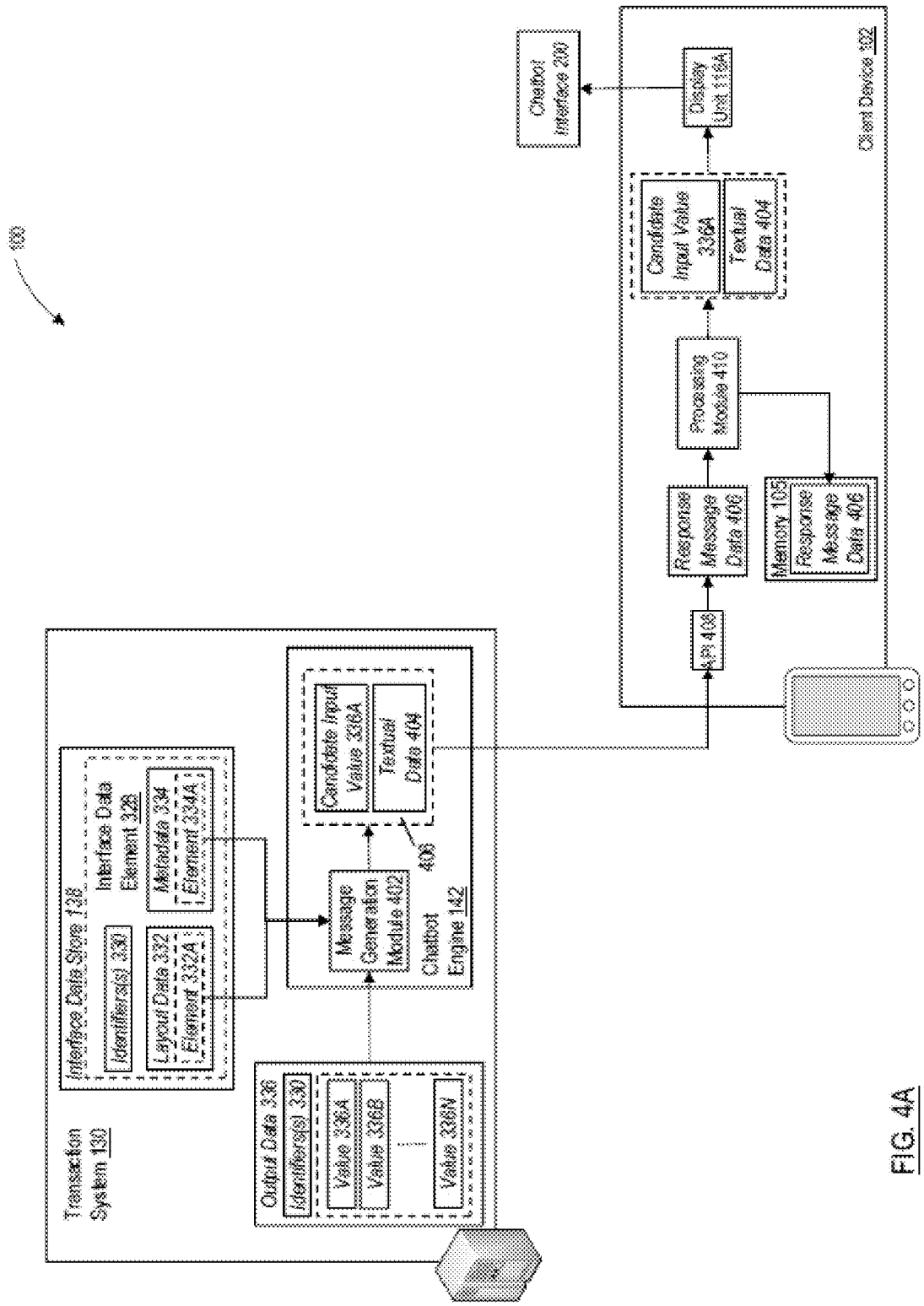

Referring to FIG. 4A, a message generation module 402 of executed chatbot engine 142 may receive output data 336 from predictive engine 146. In some instances, executed chatbot engine 142 may obtain interface identifiers 330 of the requested digital interface (e.g., the digital interface associated with the credit card application) from output data 336, and may access interface data store 138, and extract the corresponding elements of layout data 332 and metadata 334 associated with interface identifiers 330. As described herein, layout data 332 may include discrete data elements (e.g., layout data elements 332A, 332B, . . . 332N), each of which identify and characterize a corresponding one of the interface elements of the requested digital interface and further, include indexing information that specifies the sequential position of the corresponding interface element within the requested digital interface. Further, metadata 334 may include discrete metadata elements (e.g., metadata elements 334A, 334B, . . . 334N) that characterize the type or range of input data associated with corresponding ones of the interface elements within the requested digital interface, and as described herein, each of the discrete metadata elements 334A, 334B, . . . 334N may be associated with a corresponding one of the discrete data elements of layout data 332.

In some instances, message generation module 402 may perform operations that obtain, from layout data 332, metadata 334, and output data 336, respective ones of the layout data element, the metadata element, and the candidate input value associated with the corresponding one of the interface elements disposed at the first sequential position within the requested digital interface, e.g., the first interface element described herein. For example, and based on the indexing information included within each of layout data elements 332A, 332B, . . . 332N, message generation module 402 may establish an association between layout data element 332A and the first interface element of the requested digital interface, and may extract layout data element 332A from layout data 332. Message generation module 402 may also identify, and extract from metadata 334, metadata element 334A, which may be associated with layout data element 332A and further, with the first interface element. Additionally, and based on the indexing information included within each of candidate input values 336A, 336B, . . . 336N, message generation module 402 may establish an association between candidate input value 336A and the first interface element of the requested digital interface, and may extract candidate input value 336A from output data 336.

Based on layout data element 332A, metadata element 334A, and candidate input value 336A, message generation module 402 may generate one or more additional elements of message data that, when exchanged programmatically with executed chatbot application 108 during the established chatbot session, not only responds to message 208 (e.g., "I want to apply for a new credit card"), but also enables user 101 to interact with the first interface element of the requested digital interface by, among other things, confirming an accuracy of candidate input value 336A associated with the first interface element, e.g., based on additional input provided to client device 102 during the established and ongoing chatbot session. As illustrated in FIG. 4A, message generation module 402 may programmatically generate textual data 404 that refers to, and response to, message 208 (e.g., based on portions of message data 304 maintained within chatbot session data store 136), and that prompts user 101 to confirm the accuracy of candidate input value 336A, e.g., the candidate legal name of user 101.

In some instances, textual data 404 may include one or more elements of predetermined textual content, which may be maintained locally by computing system 130 within data repository 150 (not illustrated in FIG. 4A), or may be generated by message generation module 402 based on an application of one or more adaptively trained machine learning processes or artificial intelligence models (e.g., the artificial neural network described herein, etc.) to data that includes, but is not limited to, portions of message data 304 and metadata element 334A. Additionally, in some instances, textual data 404 may also include portions of metadata element 334A, which identifies and characterizes the first interface element or candidate input value 336A.

Message generation module 402 may package textual data 404 and candidate input value 336A into corresponding potions of response message data 406, may perform operations that cause computing system 130 to transmit response message data 406 across network 120 to client device 102, e.g., via the corresponding communications interface using any appropriate communications protocol. In some instances, not illustrated in FIG. 4A, message generation module 402 may also package data associated with, or identifying, the established and ongoing chatbot session into response message data 406, such as a session identifier or a cryptogram associated with chatbot engine 142.

A secure programmatic interface of client device 102, e.g., application programming interface (API) 408, may receive and route response message data 406 to a processing module 410 of executed chatbot application 108. API 408 may be associated with or established by executed chatbot application 108, and may facilitate secure, programmatic communications across communications network 120 between chatbot application 108 (e.g., as executed by client device 102) and chatbot engine 142 (e.g., as executed by computing system 130).

Processing module 410 may receive response message data 406, and may perform operations that store response message data 406 within one or more tangible, non-transitory memories, e.g., within memory 105. Further, and based on portions of response message data 406 (e.g., the information identifying the established and ongoing chatbot session, such as the session identifier or cryptogram), processing module 410 may determine that response message data 406 represents a new message within the ongoing and simulated conversation between user 101 and the programmatically generated chatbot maintained by computing system 130 (e.g., a new message within the established and ongoing chatbot session).

Figure 4B:
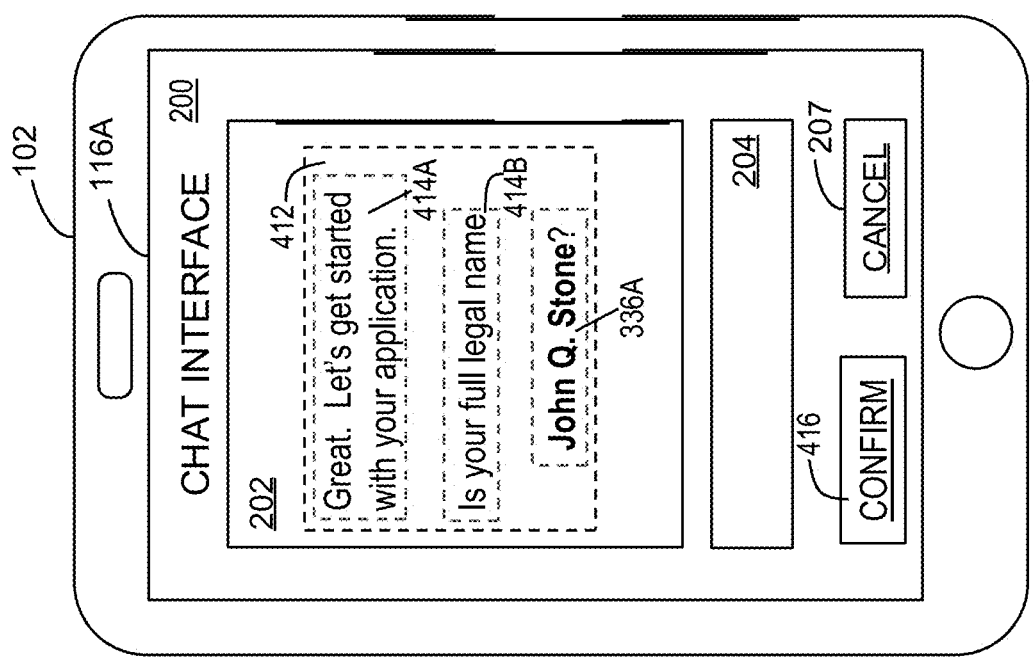
FIG. 4B is a diagram illustrating a portion of an exemplary graphical user interface, in accordance with some embodiments.

In some instances, processing module 410 may parse response message data 406 to extract textual data 404 and candidate input value 336A, and may route candidate textual data 404 and candidate input value 336A to display unit 116A, which may present textual data 404 and candidate input value 336A within a corresponding portion of chatbot interface 200, e.g., as part of the ongoing and simulated conversation. Referring to FIG. 4B, and when presented within chatbot session area 202 of chatbot interface 200, textual data 404 may establish a new message 412 that includes textual content 414A confirming the prior request for the new credit card by user 101 (e.g., "Great! Let's get started with your application"). In some instances, new message 412 may also include additional textual content 414B that, when presented in conjunction with candidate input value 336A, prompts user 101 to provide additional input to client device 102 confirm an accuracy of candidate input value 336A of the first interface element of the requested digital interface, or to modify candidate input value 336A to reflect an accurate input to the first interface element.

In some examples, described in reference to FIG. 4B, user 101 may determine that candidate input value 336A, as presented within chatbot session area 202, accurately reflects user 101's full legal name (e.g., "John Q. Stone"), and user 101 may provide additional input to client device 102 that confirms the determined accuracy of candidate input value 336A, e.g., by establishing contact between a finger or a stylus and a portion of a surface of a pressure-sensitive, touchscreen display unit that corresponds to a confirmation icon 416 present within chatbot interface 200. In other examples, user 101 may detect one or more errors in candidate input value 336A presented within new message 412 in conjunction with additional textual content 414B. Responsive to the one or more detected errors, user 101 may provide input to fillable text box 204 (e.g., via a miniaturized "virtual" keyboard presented within chatbot interface 200, as described herein) that accurately reflects the full legal name of user 101, and may provide further input to client device 102 that confirms the modification to candidate interface element 336A, e.g., by establishing contact between the finger or the stylus and the portion of the surface of the pressure-sensitive, touchscreen display unit that corresponds to confirmation icon 416.

Figure 4C:
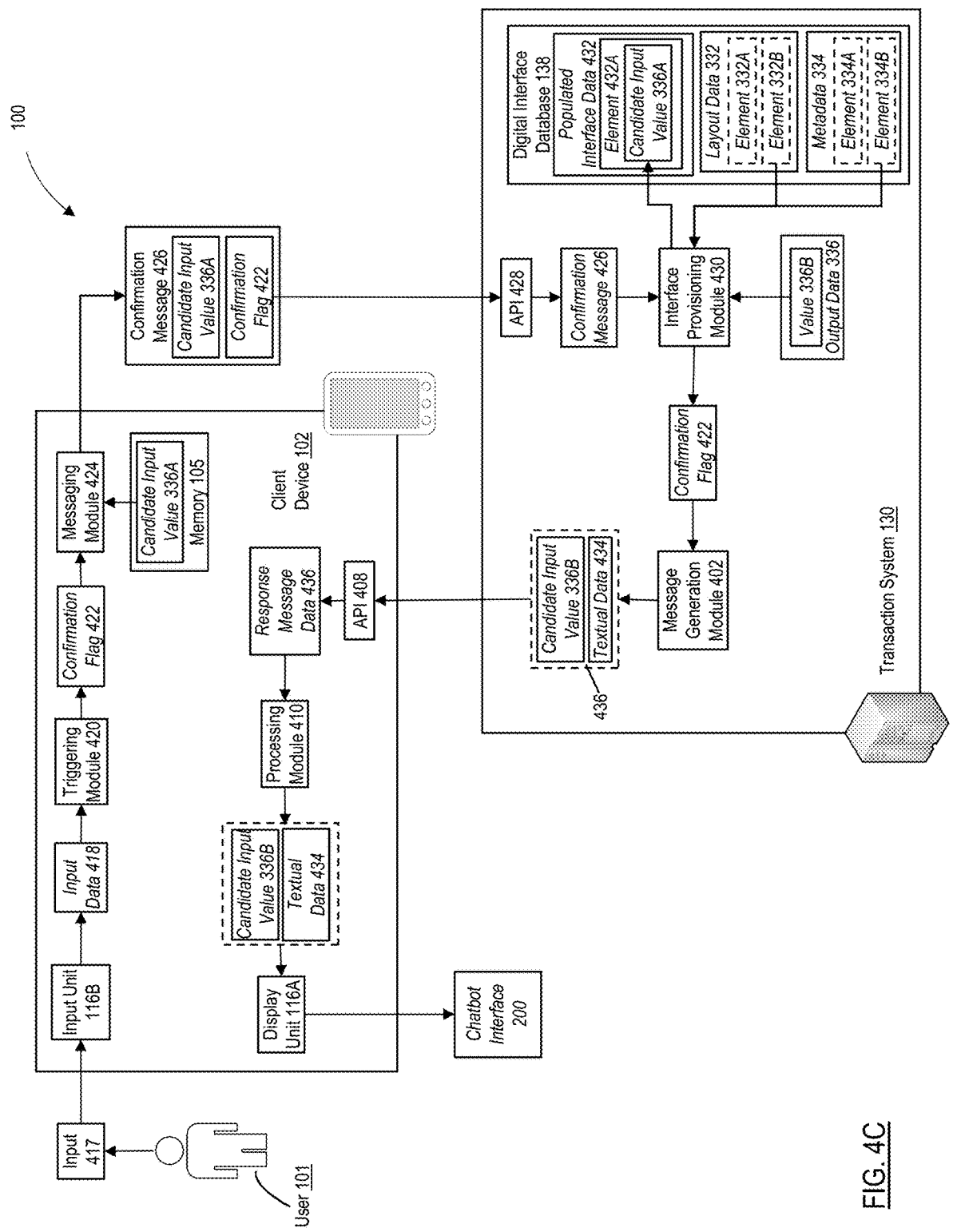
FIG. 4C is a diagram illustrating a portion of an exemplary computing environment, in accordance with some embodiments.

Referring to FIG. 4C, input unit 116B may receive input 417 from user 101, and may route input data 418 that characterizes received input 417 to a triggering module 420 of executed chatbot application 108. For example, input data 417 may identify one or more spatial positions of user 101's established contact along the surface of the pressure-sensitive, touchscreen display unit, and may also identify a duration of that established content. In some instances, triggering module 420 may perform operations that establish that user 101 selected confirmation icon 416 within chatbot interface 200, e.g., based on a determination that the one or more contact positions correspond to a presented position of confirmation icon 416 within chatbot interface 200.

Based on the determination that user 101 selected confirmation icon 416, triggering module 420 may perform further operations that establish, based on input data 418, whether the selection of confirmation icon 416 represents a confirmation of the determined accuracy of candidate input value 336A (e.g., the full name of user 101), or alternatively, a request to modify candidate input value 336A to correct one or more detected errors or omissions. By way of example, triggering module 420 may parse input data 418 to identify a presence, or an absence, of additional data modifying candidate input value 336A.

If, for example, triggering module 420 were unable to identify the presence of the additional data within input data 418, triggering module 420 may establish that user 101's selection of confirmation icon 416 represents the confirmation of the determined accuracy of candidate input value 336A, and triggering module 420 may generate a data flag (e.g., confirmation flag 422) indicative of the confirmation of the determined accuracy, and may provide confirmation flag 422 as an input to a messaging module 424 of executed chatbot engine 142. As illustrated in FIG. 4C, messaging module 424 may receive confirmation flag 422, which confirms the determined accuracy of candidate input value 336A, and may package confirmation flag 422 and candidate input value 336A (e.g., as maintained within and extracted from memory 105) into corresponding portions of a confirmation message 426.

In some instances, confirmation message 426 may also include the unique identifier of user 101 (e.g., the alphanumeric login credential of user 101), the unique device identifier of client device 102 (e.g., the IP or MAC address of client device 102) and additionally, or alternatively, the unique identifier of chatbot application 108 (e.g., the application-specific cryptogram described herein). Messaging module 424 may perform additional operations that cause client device 102 to transmit confirmation message 426 across network 120 to computing system 130, e.g., via communications interface 118 using any appropriate communications protocol.

In other examples, not illustrated in FIG. 4C, triggering module 420 may detect the presence one or more elements of the additional data within input data 418, which reflect a requested modification to candidate input value 336A. Triggering module 420 may perform further operations that generate an additional data flag, e.g., a modification flag, indicative of the requested modification, and provide the modification flag and the one or more elements of additional data as inputs to messaging module 424, which may perform any of the exemplary processes described herein to package the modification flag and the one or more elements of additional data into corresponding portions of a modification message. As described herein, messaging module 424 may perform additional operations that cause client device 102 to transmit the modification message across network 120 to computing system 130, e.g., via communications interface 118 using any appropriate communications protocol.

Referring back to FIG. 4C, a secure programmatic interface of computing system 130, such as an application programming interface (API) 428, may receive and route confirmation message 426 to an interface provisioning module 430 executed by computing system 130. API 428 may be associated with or established by executed interface provisioning module 430, and may facilitate secure, programmatic communications across communications network 120 between interface provisioning module 430 (e.g., as executed by computing system 130) and chatbot application 108 (e.g., as executed by client device 102).

As described herein, confirmation message 426 may include confirmation flag 422 and candidate input value 336A. In some instances, confirmation message 426 may also include the unique identifier of user 101 (e.g., the alphanumeric login credential of user 101), the unique device identifier of client device 102 (e.g., the IP or MAC address of client device 102) and additionally, or alternatively, the unique identifier of chatbot application 108 (e.g., the application-specific cryptogram described herein). By way of example, executed interface provisioning module 430 may perform operations (not illustrated in FIG. 4C) that parse confirmation message 426 and extract the unique identifiers of user 101, client device 102, or executed chatbot application 108, and perform operations that authenticate an identity of user 101 or client device 102 (e.g., based on portions of the unique identifiers of user 101 or client device 102) or verify an authenticity of confirmation message 426 (e.g., based on the unique identifier of executed chatbot application 108, such as an application cryptogram).

If executed interface provisioning module 430 were unable to authenticate the identity of user 101 or client device 102, or to verify the authenticity of confirmation message 426, executed interface provisioning module 430 may generate an error message indicative of the failed authentication or verification, which computing system 130 may transmit back across network 120 to client device 102. Further, executed interface provisioning module 430 may perform operations that discard received confirmation message 426, and await additional provisioning requests generated by client device 102.

In other instances, and in response to a successful authentication of the identity of user 101 or client device 102, and/or a successful verification of the authenticity of confirmation message 426, executed interface provisioning module 430 may parse confirmation message 426 to extract confirmation flag 422 and candidate input value 336A. Executed interface provisioning module 430 may process confirmation flag 422, which establishes the confirmation of the accuracy of candidate input value 336A by user 101, and perform operations that generate, for the first interface element of the requested digital interface, an element 432A of populated interface data 432 that includes the now-confirmed candidate input value 336A. As illustrated in FIG. 4C, executed interface provisioning module 430 may store element 432A of populated interface data 432 within a portion of interface data store 138, and associate element 432A with interface identifiers 330 of the requested digital interface and with corresponding elements of layout data 332 and metadata 334 associated with the requested digital interface (e.g., layout data element 332A and metadata element 334A).

Further, in some examples, executed interface provisioning module 430 may provide confirmation flag 422 as an input to message generation module 402 of executed chatbot engine 142, which may perform any of the exemplary processes described herein to obtain, from layout data 332, metadata 334, and output data 336, respective ones of the layout data element, the metadata element, and the candidate input value associated with the corresponding one of the interface elements disposed at the second sequential position within the requested digital interface, e.g., the second interface element described herein. For example, and based on the indexing information included within each of layout data elements 332A, 332B, . . . 332N, message generation module 402 may establish an association between layout data element 332B and the second interface element of the requested digital interface, and may extract layout data element 332B from layout data 332. Message generation module 402 may also identify, and extract from metadata 334, metadata element 334B, which may be associated with layout data element 332B and further, with the second interface element. Additionally, and based on the indexing information included within each of candidate input values 336A, 336B, . . . 336N, message generation module 402 may establish an association between candidate input value 336B and the second interface element of the requested digital interface, and may extract candidate input value 336B from output data 336.

Based on layout data element 332B, metadata element 334B, and candidate input value 336B, message generation module 402 may perform operations that generate one or more additional elements of message data that, when exchanged programmatically with executed chatbot application 108 during the established chatbot session, enables user 101 to interact with the second interface element of the requested digital interface by, among other things, confirming an accuracy of candidate input value 336B associated with the second interface element, e.g., through on additional input provided to client device 102 during the established and ongoing chatbot session. As illustrated in FIG. 4C, message generation module 402 may perform any of the exemplary processes described herein to programmatically generate textual data 434 that prompts user 101 to confirm the accuracy of candidate input value 336B, e.g., the candidate legal name of user 101.

Message generation module 402 may package textual data 434 and candidate input value 336B into corresponding potions of response message data 436, may perform operations that cause computing system 130 to transmit response message data 436 across network 120 to client device 102, e.g., via the corresponding communications interface using any appropriate communications protocol. In some instances, not illustrated in FIG. 4C, message generation module 402 may also package data associated with, or identifying, the established and ongoing chatbot session into response message data 436, such as a session identifier or a cryptogram associated with chatbot engine 142.

In some instances, API 408 of client device 102 may receive and route response message data 436 to processing module 410 of executed chatbot application 108, which may store response message data 436 within one or more tangible, non-transitory memories, e.g., within memory 105. Further, and based on portions of response message data 436 (e.g., the information identifying the established and ongoing chatbot session, such as the session identifier or cryptogram), processing module 410 may determine that response message data 436 represents a new message within the ongoing and simulated conversation between user 101 and the programmatically generated chatbot maintained by computing system 130 (e.g., a new message within the established and ongoing chatbot session).

Figure 4D:
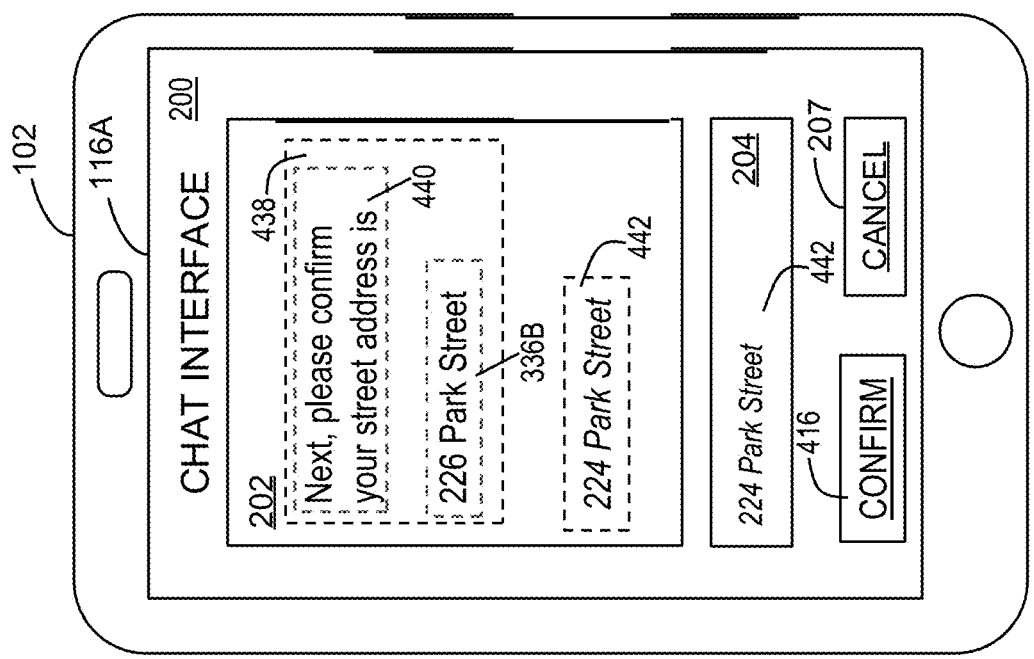
FIG. 4D is a diagram illustrating a portion of an exemplary graphical user interface, in accordance with some embodiments.

Processing module 410 may parse response message data 436 to extract textual data 434 and candidate input value 336B, and may route textual data 434 and candidate input value 336B to display unit 116A for presentation within a corresponding portion of chatbot interface 200. Referring to FIG. 4D, and when presented within chatbot session area 202 of chatbot interface 200, textual data 434 may establish a new message 438 including textual content 440 that, when presented in conjunction with candidate input value 336B, prompts user 101 to provide additional input to client device 102 that confirms an accuracy of candidate input value 336B, or that modify candidate input value 336B to reflect an accurate input to the second interface element.

In some examples, described in reference to FIG. 4D, user 101 may determine that candidate input value 336B (e.g., the predicted street address of "226 Park Street") includes one or more errors or omissions. Responsive to the one or more detected errors or omissions, user 101 may provide input to fillable text box 204 (e.g., via a miniaturized "virtual" keyboard presented within chatbot interface 200, as described herein) that accurately reflects the correct street address 442 of user 101, e.g., "224 Park Street." As described herein, user 101 may also provide input to client device 102 that confirms the modification to candidate input value 336B, e.g., by establishing contact between the finger or the stylus and the portion of the surface of the pressure-sensitive, touchscreen display unit that corresponds to confirmation icon 416.

Figure 4E:
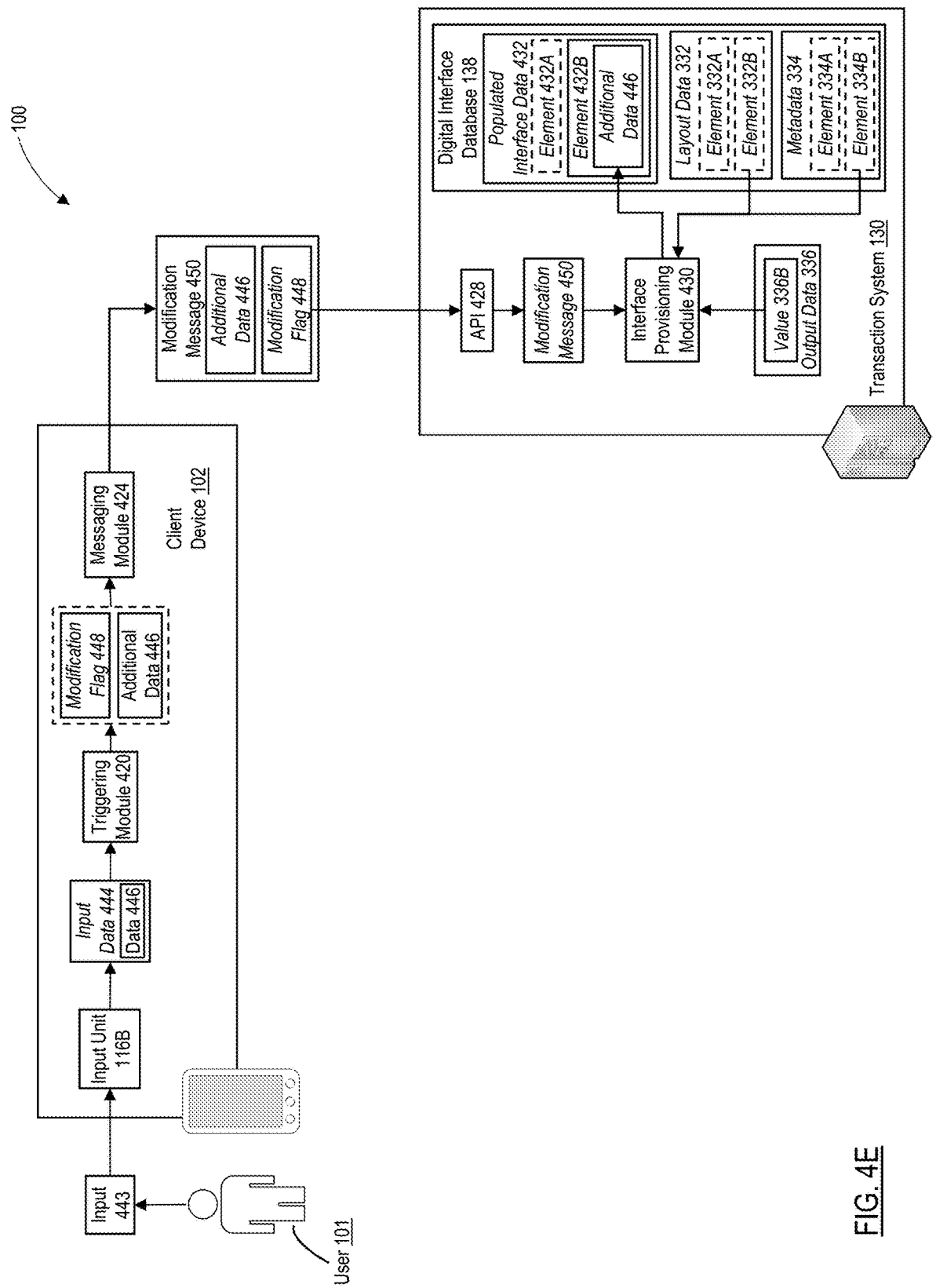
FIG. 4E is a diagram illustrating a portion of an exemplary computing environment, in accordance with some embodiments.

Referring to FIG. 4E, input unit 116B may receive input 443 from user 101, and may route input data 444 that characterizes received input 443 to triggering module 420 of executed chatbot application 108, which may perform any of the exemplary processes described herein to establish that user 101 selected confirmation icon 416 within chatbot interface 200, e.g., based on a determination that the one or more contact positions correspond to a presented position of confirmation icon 416 within chatbot interface 200. Based on the determination that user 101 selected confirmation icon 416, triggering module 420 may perform any of the exemplary processes described herein to establish, based on input data 444, whether the selection of confirmation icon 416 represents a confirmation of the determined accuracy of candidate input value 336B (e.g., the street address of user 101), or alternatively, a request to modify candidate input value 336B to correct one or more detected errors or omissions.

By way of example, triggering module 420 may parse input data 418 and detect a presence of additional data 446 that modifies candidate input value 336B and specifies the correct street address of user 101 (e.g., 224 Park Street). Based on the detection of additional data 446, triggering module 420 may perform operations that generate a data flag, e.g., a modification flag 448, indicative of the requested modification, and provide modification flag 448 and additional data 446 as inputs to messaging module 424 of executed chatbot engine 142. As illustrated in FIG. 4D, messaging module 424 may receive modification flag 448, which confirms the modification to candidate input value 336B, and may package modification flag 448 and additional data 446 into corresponding portions of a modification message 450.

In some instances, modification message 450 may also include the unique identifier of user 101 (e.g., the alphanumeric login credential of user 101), the unique device identifier of client device 102 (e.g., the IP or MAC address of client device 102) and additionally, or alternatively, the unique identifier of chatbot application 108 (e.g., the application-specific cryptogram described herein). Messaging module 424 may perform additional operations that cause client device 102 to transmit modification message 450 across network 120 to computing system 130, e.g., via communications interface 118 using any appropriate communications protocol.

In some instances, API 428, may receive and route modification message 450 to executed interface provisioning module 430, which may perform operations (not illustrated in FIG. 4E) that parse modification message 450 and extract the unique identifiers of user 101, client device 102, or executed chatbot application 108, and perform operations that authenticate an identity of user 101 or client device 102 (e.g., based on portions of the unique identifiers of user 101 or client device 102) or verify an authenticity of confirmation message 426 (e.g., based on the unique identifier of executed chatbot application 108, such as an application cryptogram).

If executed interface provisioning module 430 were unable to authenticate the identity of user 101 or client device 102, or to verify the authenticity of confirmation message 426, executed interface provisioning module 430 may generate an error message indicative of the failed authentication or verification, which computing system 130 may transmit back across network 120 to client device 102. Further, executed interface provisioning module 430 may perform operations that discard received modification message 450, as described herein.

In other instances, and in response to a successful authentication of the identity of user 101 or client device 102, and/or a successful verification of the authenticity of confirmation message 426, executed interface provisioning module 430 may parse modification message 450 to extract modification flag 448 and additional data 446, which specifies the modification to candidate input value 336B (e.g., the correct street address of "224 Park Street"). Executed interface provisioning module 430 may process modification flag 448, which establishes the requested modification to candidate input value 336B by user 101, and perform operations that generate, for the second interface element of the requested digital interface, an element 432B of populated interface data 432 that includes additional data 446 and reflects the modification to candidate input value 336B. As illustrated in FIG. 4E, executed interface provisioning module 430 may store element 432B of populated interface data 432 within a portion of interface data store 138, and associate element 432B with interface identifiers 330 of the requested digital interface and with corresponding elements of layout data 332 and metadata 334 associated with the requested digital interface (e.g., layout data element 332B and metadata element 334B).

Although not illustrated in FIGS. 4A-4E, computing system 130 may, in conjunction with client device 102, perform any of the exemplary processes described herein to (i) verify an accuracy of each of the candidate input values associated with the interface elements of the requested digital interface based on sequential and successive elements of message data programmatically exchanged with executed chatbot application 108 during the existing chatbot session, and (ii) populate the interface elements of the requested digital interface (e.g., the digital interface associated with the credit card application) based on corresponding ones of the verified input values. For example, and upon completion of these exemplary processes, executed chatbot engine 142 may store, within interface data store 138, elements of populated interface data 432 that specify the verified (e.g., confirmed or modified) input value for each of the interface elements included within the requested digital interface, e.g., the digital interface for the credit card application.

Through the implementation of these exemplary processes, computing system 130 may populate fully the requested digital interface based on elements of messaging data exchanged programmatically within the established chatbot session. By populating the requested digital interface without requiring the rendering and presentation of the interface elements by client device 102, certain of these exemplary processes may enhance an ability of a user to interact with these complex digital interfaces through devices having display units or input units of limited functionality, such as smart phones, wearable devices, and digital assistants. Further, and based on additional message data exchanged programmatically through the chatbot session, certain of these exemplary processes may initiate a performance of additional operations associated with the populated interface data without rendering the digital interface for presentation by client device 102.

By way of example, and upon population of the requested digital interface based on the elements of messaging data exchanged programmatically within the established chatbot session, executed chatbot engine 142 may generate a confirmatory message that includes an additional flag indicative of the completed population of the requested digital interface. The confirmatory message may, in some instances, also include additional textual data that, when presented within a portion of chatbot interface 200 by client device 102, prompts user 101 to provide further input to client device 102 that either requests a submission of the credit card application for review and processing (e.g., based a concatenation of the elements of populated interface data 432, as maintained within interface data store 138), or alternatively, requests an opportunity to review the requested digital interface prior to submission. Executed chatbot engine 142 may also package data associated with, or identifying, the established and ongoing chatbot session into the confirmatory message, such as a session identifier or a cryptogram associated with chatbot engine 142.

Executed chatbot engine 142 may perform additional operations that cause computing system 130 to transmit the confirmatory message across network 120 to client device 102, e.g., via the corresponding communications interface using any appropriate communications protocol. In some instances, a programmatic interface established and maintained by client device 102, such as API 408 of client device 102, may receive and route the confirmatory message to executed chatbot application 108. Further, and based on portions of the confirmatory message (e.g., the additional flag, information identifying the established and ongoing chatbot session, such as the session identifier or cryptogram, etc.), executed chatbot application 108 may determine that the confirmatory message represents a new message within the established and ongoing chatbot session.

Figure 5:
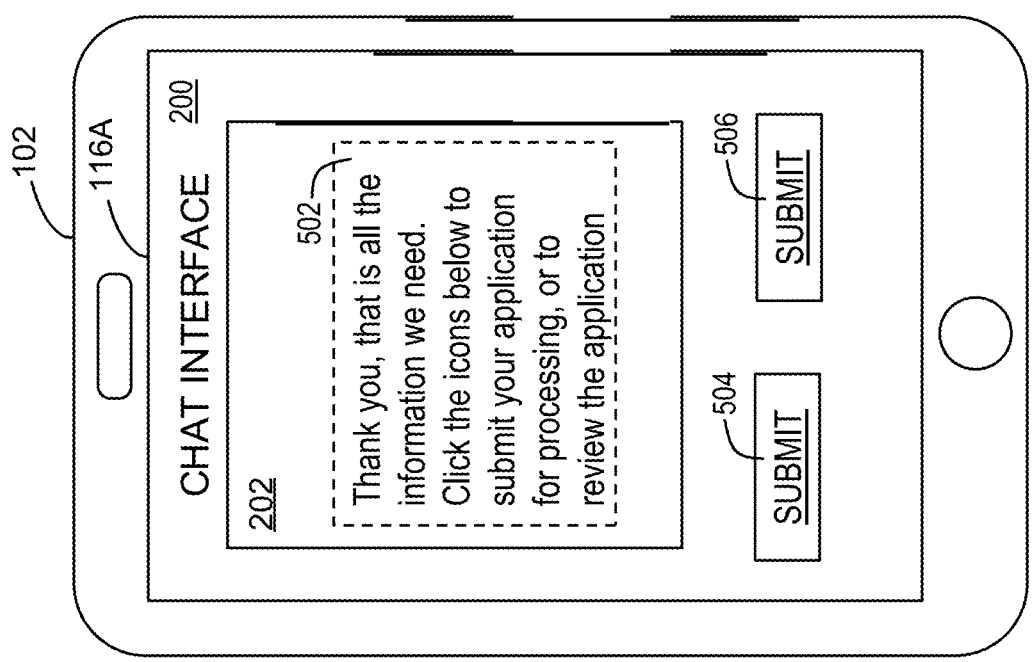
FIG. 5 is a diagram illustrating a portion of an exemplary graphical user interface, in accordance with some embodiments.

Executed chatbot application 108 may parse the confirmatory message to extract the additional textual data, and may route the additional textual data to display unit 116A for presentation within a corresponding portion of chatbot interface 200. Referring to FIG. 5, and when presented within chatbot session area 202 of chatbot interface 200, textual content 502 may confirm, to user 101, the successful population of the requested digital interface (e.g., the digital interface associated with the credit card application), and may prompt user 101 to provide additional input to client device 102 that either requests a submission of the credit card application for review and processing, or alternatively, requests an opportunity to review the requested digital interface prior to submission.

For example, user 101 may elect to request submission of the credit card application for review and processing, and as illustrated in FIG. 5, may provide input to client device 102 that confirms the requested submission, e.g., by establishing contact between the finger or the stylus and the portion of the surface of the pressure-sensitive, touchscreen display unit that corresponds to a confirmation and submission icon 504 within chatbot interface 200. Based on the provisioned input, executed chatbot application 108 may perform any of the exemplary processes described herein to generate and transmit a submission request across network 120 to computing system 130, e.g., via communications interface 118 using any appropriate communications protocol. A secure, programmatic interface established and maintained by computing system 130, such as API 428, may receive and route the submission request to executed chatbot engine 142, which may perform operations that concatenate the elements of populated interface data 432 (e.g., as maintained within interface data store 138) to establish credit-card application data, and that transmit the credit-card application data to one or more additional computing systems for review, processing, and approval.

In other examples, user 101 may elect to review the populated digital interface for the credit card application prior to review and processing. As illustrated in FIG. 5, may provide input to client device 102 that confirms the request to review the populated digital interface, e.g., by establishing contact between the finger or the stylus and the portion of the surface of the pressure-sensitive, touchscreen display unit that corresponds to review application icon 506 within chatbot interface 200. For example, review application icon

506 may represent a deep-link to the populated digital interface associated with the credit card application, and based on the provisioned input, executed chatbot application 108 may perform operations that cause client device 102 to render and present the populated digital interface via display unit 116A, e.g., within a viewing window of a web browser executed by client device 102.

In other instances, and based on the provisioned input, executed chatbot application 108 may perform any of the exemplary processes described herein to generate and transmit an application review request across network 120 to computing system 130, e.g., via communications interface 118 using any appropriate communications protocol. A secure, programmatic interface established and maintained by computing system 130, such as API 428, may receive and route the application review request to executed chatbot engine 142, which may perform operations that concatenate the elements of populated interface data 432 (e.g., as maintained within interface data store 138) to establish credit-card application data, and that transmit the credit-card application data to client device 102, e.g., for rendering and presentation on display unit 116A (such as within the viewing window of the executed web browser), or in a predetermined format (e.g., a PDF document) to an email address of user 101.

In some examples, described herein, user 101 may provide input to client device 102, and as such, may interact with chatbot interface 200, via a miniaturized "virtual" keyboard presented within digital chatbot interface 200. In other instances, chatbot application 108 may also include one or more executed text-to-speech module that, when executed by client device 102, convert elements of the programmatically exchanged message data received from executed chatbot engine 142 (e.g., response message data 406 of FIG. 4A, response message data 436 of FIG. 4C, etc.) into corresponding elements of audio content for presentation to user 101 via a corresponding speaker, e.g., an embedded speaker coupled to processor 104 or a remote speaker coupled to client device 102 via one or more communications protocols, such as a Bluetooth™ or a NFC communication protocol.

In other examples, any of the exemplary elements of user input (e.g., input 417 of FIG. 4C, input 443 of FIG. 4E, etc.) may include audio content representative of a spoken utterance, which may be captured by a corresponding microphone embedded into client device 102 (e.g., as a portion of input unit 116B) or in communication with client device 102 (e.g., across a short-range communications channel, such as Bluetooth™ etc.). Executed chatbot application 108 may include one or more application modules that convert the audio content into corresponding elements of the input data described herein, input data 418 of FIG. 4C, input data 444 of FIG. 4E, etc. As such, these exemplary processes, as described herein, may enhance an ability of a user to interact with these complex digital interfaces during a programmatically established chatbot session through devices having display units of limited functionality, such as wearable devices or smart watches.

Figure 6:
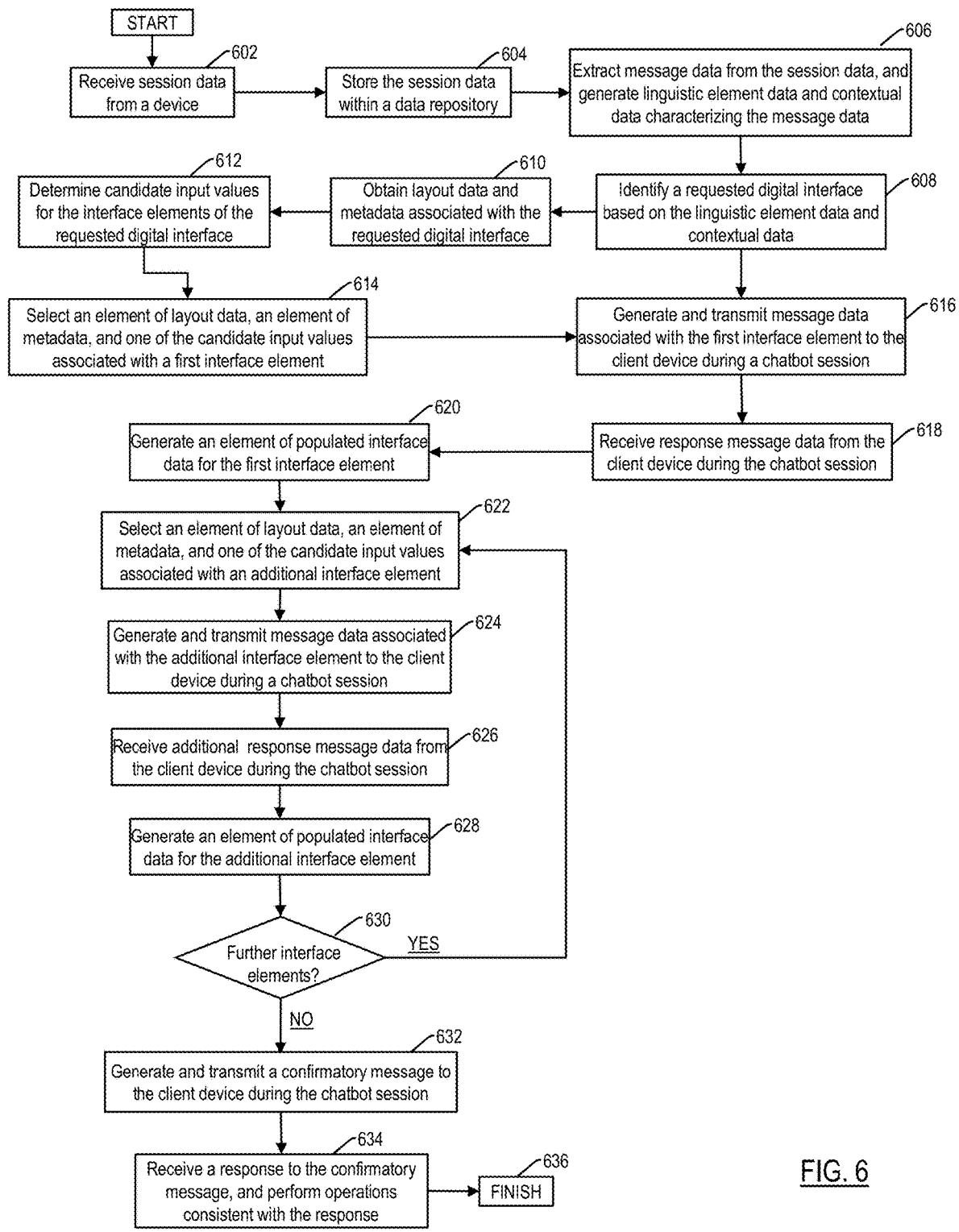
FIG. 6 is a flowchart of an exemplary process for dynamically configuring and populating a digital interface during a programmatically established chatbot session, in accordance with some embodiments.

FIG. 6 is a flowchart of a process 600 for dynamically configuring, populating a digital interface based on sequential elements of message data exchanged during a programmatically established chatbot session, in accordance with some exemplary embodiments. For example, a network-connected computing system operating within environment 100, such as computing system 130, may perform one or more of the steps of exemplary process 600.

Referring to FIG. 6, computing system 130 may receive one or more elements of chatbot session data from client device 102 (e.g., in step 602). As described herein, the chatbot session data may be generated by one or more chatbot application programs executed at client device 102 (e.g., chatbot application 108 of FIG. 1) during a chatbot session established between the one or more chatbot application programs and a chatbot engine executed at computing system 130 (e.g., chatbot engine 142 of FIG. 1). In some instances, the session data may include message data, which includes textual content representative of a message provided by user 101 as an input to a chatbot interface generated and rendered for presentation by the one or more executed chatbot application. Further, and as described herein, the message may request access to one or more digital interfaces available to, and supported by, computing system 130, such as, but not limited to, a digital interface associated with a credit card application, an application for a mortgage, or a tax return.

Computing system 130 may store the received session data within a portion of a data repository associated with the established chatbot session (e.g., in step 604). Further, computing system 130 may perform any of the exemplary processes described herein to extract the message data from the received session data, and may apply any of the exemplary natural language processing (NLP) algorithms described herein to all or a portion of the message data (e.g., in step 606). Based on the application of these exemplary NLP algorithms to all or the portion of the message data, computing system 130 may perform any of the exemplary processes described herein to generate linguistic element data, which includes each discrete linguistic element within the message, and contextual information that specifies a context or meaning of the combination of the discrete linguistic elements (e.g., also in step 606).

Based on the linguistic element data and the contextual information, computing system 130 may perform any of the exemplary processes described herein to identify the digital interface requested by message (e.g., in step 608). Computing system may also perform any of the exemplary processes described herein to obtain, for the requested digital interface, layout data that identifies one or more discrete interface elements within the requested digital interface and that specifies a sequential position of the discrete interface elements within the requested digital interface, and corresponding elements of information, e.g., metadata, that characterize a type or range of input data associated with each of the discrete interface elements (e.g., in step 610).

Based on portions of the obtained layout data and metadata associated with the requested digital interface, computing system 130 may perform any of the exemplary processes described herein to compute a candidate input value for each interface element disposed a corresponding sequential position within the requested digital interface (e.g., in step 612). In some instances, computing system 130 may maintain at least one of the candidate input values within a locally accessible data repository (e.g., within one of user database 132, confidential data store 134, or chatbot session data store 136 of FIG. 1), and computing system 130 may perform operations that identify and extract the at least one of the candidate input values from the locally accessible data repositories based on corresponding elements of the layout data and metadata.

In other instances, in step 612, computing system 130 may compute at least one of the candidate input values based on an application of any of the exemplary predictive models described herein to model input associated with corresponding ones of the interface elements within the requested digital interface. By way of example, and for a particular one of the interface elements, the model input may include, but is not limited to, all or a selected portion of the elements of metadata associated with the particular interface element (e.g., that characterizes the type, range, or format of the appropriate input data associated with the particular interface element), additional elements of profile data, confidential data, or chatbot session data associated with user 101 (e.g., as extracted from, or selectively derived from data maintained within, one or more of user database 132, confidential data store 134, or chatbot session data store 136), and/or further elements of profile data, confidential data, or chatbot session data associated with additional users of computing system 130 that are demographically similar to user 101. As described herein, examples of the predictive models include, a deterministic or stochastic statistical process, a machine learning processes, or an artificial intelligence model.

In step 614, computing system 130 may perform any of the exemplary processes described herein to select an element of the layout data, an element of the metadata, and the candidate input value associated with a corresponding one of the interface elements disposed at a first sequential position within the requested digital interface, e.g., a "first" interface element. Based on the layout data element, the metadata element, and the candidate input value associated with the first interface element, computing system 130 may perform any of the exemplary processes described herein to generate message data that, when exchanged programmatically with client device 102 during the established chatbot session, enables user 101 to interact with the first interface element of the requested digital interface by, among other things, confirming an accuracy of the candidate input value associated with the first interface element (e.g., in step 616). As described herein, the generated message data may include the candidate input value associated with the first interface element, and may also include programmatically generated textual data that prompts user 101 to confirm the accuracy of the candidate input value. Further, in step 616, computing system 130 may also transmit the generated message data across network 120 to client device, e.g., during the established chatbot session.

As described herein, a secure programmatic interface of client device 102 may receive and route the message data to an executed chatbot application, such as chatbot application 108 of FIG. 1. The executed chatbot application may parse the received message data to extract the textual data and the candidate input value associated with the first interface element, and may perform any of the exemplary processes described herein to present the textual data and the candidate input value within a corresponding portion of a presented chatbot interface, e.g., chatbot interface 200 described herein.

By way of example, and as described herein, user 101 may provide additional input to chatbot interface 200 (e.g., via input unit 116B of client device 102) that either confirms a determined accuracy of the candidate input value, or alternatively, requests a modification to the candidate input value, e.g., based on a detected error or omission. In some instances, the executed chatbot application may perform any of the exemplary processes described herein generate one or more elements of message data that reflect the now-confirmed candidate input value or the requested modification to that candidate input value, and client device 102 may transmit the one or more elements of message data across network 120 to computing system 130, e.g., via communications interface 118 using any appropriate communications protocol.

Computing system 130 may receive the one or more elements of response message data from client device 102 (e.g., in step 618). In some instances, computing system 130 may perform any of the exemplary processes described herein to generate an element of populated interface data for the first interface element that includes the now-confirmed candidate input value or alternatively, the requested modification to that candidate input value, and to store the generated element of populated interface data 432 within a portion of a locally accessible data repository, such as interface data store 138 of FIG. 1 (e.g., in step 620).

In step 622, computing system 130 may perform any of the exemplary processes described herein to select an element of the layout data, an element of the metadata, and the candidate input value associated with an additional one of the interface elements disposed at a next sequential position within the requested digital interface. The additional interface element may, as described herein, correspond to a second interface element disposed subsequent to the first interface element within the digital interface, or one or more further interface elements disposed subsequent to that second interface element. Based on the layout data element, the metadata element, and the candidate input value associated with the additional interface element, computing system 130 may perform any of the exemplary processes described herein to generate message data that, when exchanged programmatically with client device 102 during the established chatbot session, enables user 101 to interact with the additional interface element of the requested digital interface by, among other things, confirming an accuracy of the candidate input value associated with the additional interface element, or requesting a modification to that candidate input value (e.g., in step 624). Further, in step 624, computing system 130 may also transmit the generated message data across network 120 to client device, e.g., during the established chatbot session.

In some instances, the secure programmatic interface of client device 102 may receive and route the message data to the executed chatbot application, which may parse the received message data to extract the textual data and the candidate input value associated with the additional interface element. The executed chatbot application may also cause client device 102 to perform any of the exemplary processes described herein the present the textual data and the candidate input value within a corresponding portion of a presented chatbot interface, e.g., chatbot interface 200 described herein.

Further, and as described herein, user 101 may provide additional input to chatbot interface 200 (e.g., via input unit 116B of client device 102) that either confirms a determined accuracy of the candidate input value associated with the additional interface element, or alternatively, requests a modification to the candidate input value associated with the additional interface element. In some instances, the executed chatbot application may perform any of the exemplary processes described herein generate one or more additional elements of response message data that reflect the now-confirmed candidate input value or the requested modification to that candidate input value, and client device 102 may transmit the one or more elements of response message data across network 120 to computing system 130, e.g., via communications interface 118 using any appropriate communications protocol.

Computing system 130 may receive the one or more additional elements of response message data from client device 102 (e.g., in step 626). Computing system 130 may perform any of the exemplary processes described herein to generate an element of populated interface data for the additional interface element that includes the now-confirmed candidate input value or alternatively, the requested modification to that candidate input value, and to store the generated element of pre-populated interface data within a portion of the locally accessible data repository, such as interface data store 138 of FIG. 1 (e.g., in step 628).

In some instances, computing system 130 may parse the layout data associated with the requested digital interface, and may perform any of the exemplary processes described to determine whether the locally accessible data repository maintains an element of populated interface data for each of the interface elements disposed sequentially within the requested digital interface (e.g., in step 630). If, for example, computing system 130 were to determine that one or more of the interface elements disposed sequentially within the requested digital interface await processing and population (e.g., step 630; YES), exemplary process 600 may pass back to step 622, and computing system 130 may perform any of the exemplary processes described herein to obtain an element of the layout data, an element of the metadata, and the candidate input value associated with an additional one of the interface elements disposed at a next sequential position within the requested digital interface.

Alternatively, if computing system 130 were to determine the locally accessible data repository maintains an element of populated interface data for each of the interface elements disposed sequentially within the requested digital interface (e.g., step 630; NO), computing system 130 may perform any of the exemplary processes described herein to generate a confirmatory message indicative of the completed population of the requested digital interface, and to transmit that confirmatory message across network 120 (e.g., in step 632). In some instances, computing system 130 may receive a response to the confirmatory message from client device 102 (e.g., as generated programmatically based on additional user input during the existing chatbot session), and may perform one or more operations involving the elements of the populated interface data in accordance with the received response (e.g., in step 634). Examples of these operations include, but are not limited to, concatenating the elements of the pre-populated interface data to establish credit-card application data, transmitting the credit-card application data to one or more additional computing systems for review, processing, and approval, or transmitting formatted or unformatted portions of the credit-card application data to client device 102. Exemplary process 600 is then complete in step 636.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Exemplary embodiments of the subject matter described in this specification, such as, but not limited to, chatbot application 108, chatbot engine 142, natural-language processing (NLP) engine 144, predictive engine 146, APIs 301, 408, and 428, session management module 320, interface selection module 326, message generation module 402, processing module 410, triggering module 420, messaging module 424, and interface provisioning module 430, can be implemented as one or more computer programs, i.e., one or more modules of computer program instructions encoded on a tangible non-transitory program carrier for execution by, or to control the operation of, a data processing apparatus (or a computer system).

Additionally, or alternatively, the program instructions can be encoded on an artificially generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The terms "apparatus," "device," and "system" refer to data processing hardware and encompass all kinds of apparatus, devices, and machines for processing data, including, by way of example, a programmable processor such as a graphical processing unit (GPU) or central processing unit (CPU), a computer, or multiple processors or computers. The apparatus, device, or system can also be or further include special purpose logic circuitry, such as an FPGA (field programmable gate array) or an ASIC (application-specific integrated circuit). The apparatus, device, or system can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array), an ASIC (application-specific integrated circuit), one or more processors, or any other suitable logic.

Computers suitable for the execution of a computer program include, by way of example, general or special purpose microprocessors or both, or any other kind of central processing unit. Generally, a CPU will receive instructions and data from a read-only memory or a random-access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display unit, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification includes many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
   a communications interface;
   a memory storing instructions; and
   at least one processor coupled to the communications interface and to the memory, the at least one processor being configured to execute the instructions to:
   receive, from a device via the communications interface, first messaging data associated with a request to access a first digital interface, the first messaging data being received during a communications session established with an application program executed by the device;
   determine a candidate input value for a first interface element of the first digital interface, and based on an application of a trained machine-learning or artificial-intelligence process to an input dataset that includes at least a portion of an element of metadata associated with the first interface element, generate textual content comprising linguistic elements that characterize at least one of the first interface element or the candidate input value;
   generate second messaging data that includes the candidate input value and the textual content, and transmit the second messaging data to the device via the communications interface, the second messaging data being transmitted during the established communications session, and the device being configured to present the textual content and the candidate input value within a second digital interface associated with the established communications session;

receive, via the communications interface, third messaging data from the device during the established communications session, the third messaging data comprising a confirmation of the candidate input value, and the third messaging data being generated by the executed application program; and based on the third messaging data, generate first populated interface data that associates the first interface element with the confirmed candidate input value, and store the populated interface data within a portion of the memory.

2. The apparatus of claim 1, wherein the at least one processor is further configured to execute the instructions to:
establish the communications session with the executed application program;
based on the established communications session, receive the first messaging data from the device via the communications interface, the third messaging data being generated by the executed application program.

3. The apparatus of claim 1, wherein the at least one processor is further configured to identify the digital interface based on at least a portion of the first messaging data, the digital interface comprising a plurality of interface elements that includes the first interface element.

4. The apparatus of claim 1, wherein the at least one processor is further configured to:
identify one or more discrete linguistic elements within the first messaging data, and generate contextual information associated with the first messaging data, based on an application of a statistical process, a machine learning process, or an artificial intelligence process to portions of the first messaging data; and
identify the digital interface based on at least one of the contextual information or the one or more discrete linguistic elements.

5. The apparatus of claim 1, wherein:
the third messaging data further comprises a modification to the candidate input value; and
the at least one processor is further configured to:
modify the candidate input value based in accordance with the third messaging data; and
generate the first populated interface data based on the modified input value, the first populated interface data associating the first interface element with the modified input value.

6. The apparatus of claim 1, wherein:
the digital interface comprises a plurality of interface elements, the plurality of interface elements comprising the first interface element;
the at least one processor is further configured to execute the instructions to load, from the memory, layout data and metadata associated with the digital interface, the layout data comprising indexing information that specifies sequential positions of the plurality of interface elements within the digital interface, and the metadata identifying input data types for the plurality of interface elements.

7. The apparatus of claim 6, wherein the at least one processor is further configured to executed the instructions to:
identify the first interface element based on the indexing information, the first interface element being disposed within the digital interface at a first one of the sequential positions;

obtain a first element of the layout data associated with the first interface element, and obtain a first element of the metadata associated with the first interface element; and
determine the candidate input value for the first interface element based on at least one of the first layout data element or the first metadata element.

8. The apparatus of claim 7, wherein:
the first metadata element identifies a first input data type associated with the first interface element; and
the at least one processor is further configured to identify the candidate input value within a portion of the memory, and load the candidate input value from the portion of the memory, based on the first input data type.

9. The apparatus of claim 7, wherein the at least one processor is further configured to execute the instructions to compute the candidate input value for the first interface element based on an application of a statistical process, a machine learning process, or an artificial intelligence process to at least one of a portion of the first layout data element or a portion of the first metadata element.

10. The apparatus of claim 6, wherein the at least one processor is further configured to execute the instructions to:
identify a second one of the plurality of interface elements based on the indexing information, the second interface element being disposed within the digital interface at an additional one of the sequential positions;
obtain a second element of the layout data associated with the second interface element, and obtain a second element of the metadata associated with the second interface element;
determine an additional candidate input value for the second interface element based on at least one of the second layout data element or the second metadata element;
generate and transmit, via the communications interface, fourth messaging data to the device, the fourth messaging data comprising the additional candidate input value and being transmitted during the established communications session;
receive, via the communications interface, fifth messaging data from the device during the established communications session, the fifth messaging data comprising at least one of a confirmation of, or a modification to, the additional candidate input value, and the fifth message data being generated by the executed application program; and
based on the fifth messaging data, generate second populated interface data that associates the second interface element with the confirmed or modified additional candidate input value, and store the second populated interface data within the memory.

11. The apparatus of claim 1, wherein the at least one processor is further configured to execute the instructions to:
receive, via the communications interface, fourth messaging data from the device during the established communications session, the fourth messaging data being generated by the executed application program; and
based on the fourth messaging data, performing one or more operations associated with the digital interface, the one or more operations comprising at least one of (i) transmitting, via the communications interface, the generated elements of populated interface data to an additional computing system or (ii) transmitting, via the communications interface, the generated elements of populated interface data to the device.

12. A computer-implemented method, comprising:
receiving, using at least one processor, first messaging data associated with a request to access a first digital interface, the first messaging data being received from a device during a communications session established with an application program executed by the device;
determining, using the at least one processor, a candidate input value for a first interface element of the first digital interface, and based on an application of a trained machine-learning or artificial-intelligence process to an input dataset that includes at least a portion of an element of metadata associated with the first interface element, generating, using the at least one processor, textual content comprising linguistic elements that characterize at least one of the first interface element or the candidate input value;
using the at least one processor, generating second messaging data that includes the candidate input value and the textual content, and transmitting the second messaging data to the device, the second messaging data being transmitted during the established communications session, and the device being configured to present the textual content and the candidate input value within a second digital interface associated with the established communications session;
receiving, using the at least one processor, third messaging data from the device during the established communications session, the third messaging data comprising a confirmation of the candidate input value, and the third messaging data being generated by the executed application program; and
based on the third messaging data, generating, using the at least one processor, first populated interface data that associates the first interface element with the confirmed candidate input value, and storing, using the at least one processor, the populated interface data within a portion of a data repository.

13. The computer-implemented method of claim 12, further comprising:
establishing, using the at least one processor, the communications session with the executed application program;
based on the established communications session, receiving, using the at least one processor, the first messaging data from the device, the third messaging data being generated by the executed application program; and
identifying, using the at least one processor, the digital interface based on at least a portion of the first messaging data, the digital interface comprising a plurality of interface elements that includes the first interface element.

14. The computer-implemented method of claim 12, wherein identifying the digital interface comprises:
identifying one or more discrete linguistic elements within the first messaging data, and generating contextual information associated with the first messaging data, based on an application of a statistical process, a machine learning process, or an artificial intelligence process to portions of the first messaging data; and
identifying the digital interface based on at least one of the contextual information or the one or more discrete linguistic elements.

15. The computer-implemented method of claim 12, wherein:
the third messaging data further comprises a modification to the candidate input value; and
the computer-implemented method further comprises modifying, using the at least one processor, the candidate input value based in accordance with the third messaging data; and
the generating comprises generating the first populated interface data based on the modified input value, the first populated interface data associating the first interface element with the modified input value.

16. The computer-implemented method of claim 12, wherein:
the digital interface comprises a plurality of interface elements, the plurality of interface elements comprising the first interface element;
the computer-implemented method further comprises obtaining, using the at least one processor, layout data and metadata associated with the digital interface, the layout data comprising indexing information that specifies sequential positions of the plurality of interface elements within the digital interface, and the metadata identifying input data types for the plurality of interface elements.

17. The computer-implemented method of claim 16, further comprising:
identifying, using the at least one processor, the first interface element based on the indexing information, the first interface element being disposed within the digital interface at a first one of the sequential positions;
obtaining, using the at least one processor, a first element of the layout data associated with the first interface element, and obtain a first element of the metadata associated with the first interface element; and
determining, using the at least one processor, the candidate input value for the first interface element based on at least one of the first layout data element or the first metadata element.

18. The computer-implemented method of claim 17, further comprising computing, using the at least one processor, the candidate input value for the first interface element based on an application of a statistical process, a machine learning process, or an artificial intelligence process to at least one of a portion of the first layout data element or a portion of the first metadata element.

19. The computer-implemented method of claim 16, further comprising:
identifying, using the at least one processor, a second one of the plurality of interface elements based on the indexing information, the second interface element being disposed within the digital interface at an additional one of the sequential positions;
using the at least one processor, obtaining a second element of the layout data associated with the second interface element, and obtaining a second element of the metadata associated with the second interface element;
determining, using the at least one processor, an additional candidate input value for the second interface element based on at least one of the second layout data element or the second metadata element;
using the at least one processor, generating and transmitting fourth messaging data to the device, the fourth messaging data comprising the additional candidate input value and being transmitted during the established communications session;

receiving using the at least one processor, fifth messaging data from the device during the established communications session, the fifth messaging data comprising at least one of a confirmation of, or a modification to, the additional candidate input value, and the fifth message data being generated by the executed application program; and based on the fifth messaging data, generating, using the at least one processor, second populated interface data that associates the second interface element with the confirmed or modified additional candidate input value, and storing, using the at least one processor, the second populated interface data within the data repository.

20. A tangible, non-transitory computer-readable medium storing instructions that, when executed by at least one processor, cause the at least one processor to perform a method, comprising:

receiving first messaging data associated with a request to access a first digital interface, the first messaging data being received from a device during a communications session established with an application program executed by the device;

determining a candidate input value for a first interface element of the first digital interface, and based on an application of a trained machine-learning or artificial-intelligence process to an input dataset that includes at least a portion of an element of metadata associated with the first interface element, generating textual content comprising linguistic elements that characterize at least one of the first interface element or the candidate input value;

generating second messaging data that includes the candidate input value and the textual content, and transmitting the second messaging data to the device, the second messaging data being transmitted during the established communications session, and the device being configured to present the textual content and the candidate input value within a second digital interface associated with the established communications session;

receiving third messaging data from the device during the established communications session, the third messaging data comprising a confirmation of the candidate input value, and the third messaging data being generated by the executed application program; and based on the third messaging data, generating first populated interface data that associates the first interface element with the confirmed candidate input value, and storing, using the at least one processor, the populated interface data within a portion of a data repository.

21. The apparatus of claim 1, wherein the at least one processor is further configured to:

obtain the element of metadata associated with the first interface element of the digital interface, the element of metadata characterizing input data type associated with the first interface element.

* * * * *